(12) United States Patent
Ara et al.

(10) Patent No.: US 7,593,752 B2
(45) Date of Patent: Sep. 22, 2009

(54) SENSOR NODE, BASE STATION, AND SENSOR NETWORK SYSTEM

(75) Inventors: Koji Ara, Kodaira (JP); Yuji Ogata, Hachioji (JP); Shunzo Yamashita, Musasino (JP); Takanori Shimura, Chiba (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/723,691

(22) Filed: Mar. 21, 2007

(65) Prior Publication Data

US 2007/0281758 A1 Dec. 6, 2007

Related U.S. Application Data

(63) Continuation of application No. 11/208,658, filed on Aug. 23, 2005.

(30) Foreign Application Priority Data

Jan. 31, 2005 (JP) .............................. 2005-022375

(51) Int. Cl.
*H04M 1/00* (2006.01)
(52) U.S. Cl. ................... 455/561; 455/67.11
(58) Field of Classification Search ................. 455/574, 455/67.11, 561
See application file for complete search history.

(56) References Cited

U.S. PATENT DOCUMENTS

2005/0200002 A1* 9/2005 Yamashita .................. 257/723
2005/0240682 A1* 10/2005 Zhang ............................ 710/2

FOREIGN PATENT DOCUMENTS

JP 11-65915 8/1997

OTHER PUBLICATIONS

Rhee, Sokwoo, "Artifact-Resistant Power-Efficient Design of Finger-Ring Plethysmographic Sensors", IEEE Transactions on Biomedical Engineering, Vo. 48, No. 7, Jul. 2001, pp. 795-805.
"Mote Hardware Session", Crossbow, Smarter Sensors in Silicon, pp. 1-40.

* cited by examiner

*Primary Examiner*—Yuwen Pan
*Assistant Examiner*—Ankur Jain
(74) *Attorney, Agent, or Firm*—Stites & Harbison, PLLC; Juan Carlos A. Marquez, Esq

(57) ABSTRACT

This invention achieves lower electric power consumption of a sensor node for carrying out an intermittent operation, in a sensor net system. A time when the sensor node transmits a signal to a base station is estimated. Then, in accordance with the estimation, a table for storing a signal transmitted from the sensor node is installed in a wireless section of the base station. Consequently, a communication time between the sensor node and the base station can be made shorter. Also, a start time of a micro computer is set for RTC inside the sensor node, so the micro computer inside the sensor node can be put in the standby state.

9 Claims, 18 Drawing Sheets

SENSOR NODE, BASE STATION, AND SENSOR NETWORK SYSTEM

CROSS-REFERENCE TO RELATED APPLICATION

This application is a Continuation of U.S. application Ser. No. 11/208,658 filed on Aug. 23, 2005, and claims priority from U.S. application Ser. No. 11/208,658 filed on Aug. 23, 2005, which claims priority from Japanese Patent Application No. 2005-022375, filed on Jan. 31, 2005, the entire disclosure of which is incorporated herein by reference.

BACKGROUND OF THE INVENTION

This invention relates to a sensor node for carrying out an intermittent operation, a base station for receiving data from the sensor node, and a sensor network system.

Recently, a network system (hereinafter, referred to as sensor net) has been studied, in which a small electronic circuit having a radio-communication function is added to a sensor to introduce various pieces of information in a real world into an information processing apparatus in real time. A wide range of applications have been considered for the sensor net. For example, there is a medical application, in which biological information such as a pulsebeat is always monitored by a small electronic circuit with a radio circuit, a processor, a sensor, and a battery integrated thereon, monitored results are sent to a diagnosis apparatus through radio-communication, and a user's health condition is determined based on the monitored results ("Artifact-Resistant Power-Efficient Design of Finger-Ring Plenthysmographic Sensors", IEEE Transactions On Biomedical Engineering, Vol. 48, No. 7, July 2001, pp. 795-805 by Sokwoo Rhee et al.).

In order to put the sensor net into practical use widely, it is important to keep an electronic circuit (hereinafter, referred to as sensor node) on which a radio-communication function, a sensor, and a power source such as a battery are mounted without maintenance for a long period of time, to allow the electronic circuit to continue to transmit sensor data, and also important to miniaturize the outer shape of the electronic circuit. Therefore, an ultra-small sensor node capable of being set anywhere is being developed. In this stage, in terms of a practical application, it is considered to be necessary that a sensor node can be used without exchanging a battery for about one year from both aspects of maintenance cost and ease of use.

For example, "Smarter Sensors In Silicon" [online] [searched on 16 Feb. 2004], the Internet, URL: http://www.x-box.com/Support/Support_pdf_files/Motetraining/Hardware.pdf> introduces a prototype of a small sensor node having a diameter of about 3 cm, which is referred to as [Mica2 Dot]. This Mica2 Dot is provided with: an RF chip where functions necessary for a wireless communication are integrated; and a processor chip that is low in electric power consumption. In this prototype, with the intermittent operation where it is in a waiting state of 99% of the time, it is intermittently actuated for only the remaining 1% of the time, a sensor is moved, and a result is wirelessly communicated, a small battery can be used to carry out the operation of about one year.

A sensor net requires two kinds of devices, the small sensor node for carrying out the wireless communication as mentioned above and a device (hereafter, referred to as a base station) for wirelessly collecting sensed data and connecting to a wired network such as the Internet. The sensor node is driven by a battery in many cases, in view of its small size and mobility. On the contrary, the base station is stationary and driven by an AC power source, in many cases.

Because of those reasons, there are several functional differences between the sensor node and the base station. For example, in the base station, the mechanism for making the performance of hardware higher and improving a reception performance is established, in order to improve the communication performance, namely, the communication reliability and the communication distance. For example, a space diversity for setting a plurality of antennas, comparing and analyzing data obtained from both of the antennas and then creating an original normal data is typical. Moreover, the application of the space diversity such as an angle diversity or a polarization wave, and a frequency diversity of using two kinds of different frequencies are listed. For this reason, different hardware configurations are typically used between the sensor node and the base station.

Also, as a method of protecting a traffic quantity from being increased in a network, a method of installing a cache region to transiently store data having a high access frequency is known (for example, refer to JP 11-65915 A).

SUMMARY OF THE INVENTION

However, when the two kinds of the hardware consisting of the sensor node and base station are created, both of them require a development man-hour, a tuning man-power of a wireless performance, a verification man-power, an authentication reception man-power and the like. On the contrary, if the hardware configurations can be made partially common between the sensor node and the base station, there may be a possibility where a design period can be reduced.

However, the inventors of this invention discover that, if the hardware configurations are made common, attention should be paid to the following points. If the sensor node is made similar to the base station, its size is larger, its performance is higher than required, and its electric power consumption is higher. As a result, this cannot be used for the application which requires a small size, a low cost and a long operational life. On the other hand, if the sensor node is assumed to be used as the base station, this leads to a problem in that its performance is too low. For example, since the sensor node is only required to have the function of sensing and transmitting the data of a temperature and the like, it is only required to include a CPU of about several tens of MHz and a RAM of about 100 kByte, and a ROM. On the contrary, the base station is required to carry out a communication with all nodes managed by the base station and a data/schedule management and also carry out a connection to the wired network such as the Internet. Thus, only the sensor node is insufficient.

So, as a first object, a method of attaining the hardware having the performance suitable for both of them while reducing the development processes for the sensor node and the base station is mentioned. Concretely, the sensor node is designed so as to be able to process the wireless communication, and the base station using the sensor node is designed so as to be able to carry out the other processes on a newly added CPU and memory. (Hereafter, the portion of the base station constituted by using the sensor node is referred to as a base station wireless section, and the portions except it is referred to as base station controllers). The base station wireless section and the base station controller are wirelessly connected by wire through a serial interface and the like.

When such configuration is employed, the communication time between the base station wireless section and the base station controller becomes problematic. As the delay time of this serial interface becomes longer, the electric power consumption of the node becomes higher because of the following reason. Typically, the sensor node carries out the sensing at a predetermined interval (for example, once for each five minutes) and the communication with the base station, and it becomes in a standby state except when the sensing or communication is carried out, in order to reduce the electric power consumption and extend the life (hereafter, this is referred to as the intermittent operation). In the standby state, the communication cannot be performed. Thus, in order to transmit a command and the like from the base station to the node, when the node is in a receivable state, it is required to be transmitted from the base station. In order to efficiently carry out this, the base station is required to grasp when the node is in a reception state. For example, a protocol is considered where immediately after the node transmits a data, the reception state is set, and the base station sends a reception check of the data (hereafter, referred to as ACK) and the command. In this case, the sensor node is required to maintain the reception state, until the ACK and the command can be received.

In this case, the increase in the delay time of the interface between the base station wireless section and the base station controller delays the transmission of the ACK and command correspondingly. Thus, in the node, the time of the reception state is extended correspondingly, and the excessive electric power is consumed correspondingly.

Thus, when as mentioned above, the hardware of the sensor node is used to constitute the base station, in order to operate the sensor node as long as possible, a waiting time, namely, a time until the base station returns the ACK and the command after receiving the data is required to be minimized. In particular, the time used for the communication between the base station and the sensor node is minimized by using the fact that the time when the sensor node accesses the base station can be forecasted. To do so, it is necessary to consider a method of attaining the higher speed by using the intermittent operation of the sensor node, instead of attaining the higher speed by using the fact that the number of the access frequencies of the data is great such as the conventional cache method.

As the second object, the countermeasure for noise is mentioned. Usually, in the sensor node, the restriction on the size requires that a processor chip and a wireless frequency chip (RF chip) are integrated into a very small region (several cm square or smaller). On the other hand, as well known, when the wireless communication is carried out by using a weak high frequency wireless frequency signal such as the sensor node, since the radiation noise from the processor chip becomes a barrier, a reception sensibility cannot be easily improved. Usually, a digital circuit transmits and receives a signal at a rectangular wave. The rectangular wave is constituted by alternating current signals of various frequency components, and they include the signals of the frequency band extremely close to the signal components used in the wireless communication. On the other hand, the RF chip amplifies the very weak high frequency wireless frequency signal (typically, at an order of $\mu V$ or less) and demodulates desirable data. For this reason, when even the slight signal of the digital circuit is inputted to the input portion of the RF chip, the RF chip cannot normally demodulate the high frequency wireless frequency signal from the antenna. Moreover, even in the frequency component that is perfectly different at first glance, depending on non-linear input/output properties of a semiconductor device used inside an amplifying circuit LNA or RF chip, the signal of a new frequency component is synthesized, which results in the occurrence of a noise signal in a frequency band of a reception target.

For the above-mentioned problems, an electronic apparatus noted in U.S. patent application Ser. No. 10/933,270 has: a substrate; a connector for connecting a sensor; a first signal processing circuit for receiving an input of sensor data from the sensor through the connector and generating transmission data; and a second signal processing circuit for converting a transmission signal from the first signal process circuit into a high frequency signal, in which the connector and the first signal process circuit are mounted on a first surface of the substrate, and the second signal process circuit is mounted on the second surface of the substrate. Consequently, this separates the digital circuit, which acts as the generation source of the noise, from the high frequency circuit. Also, in order to make the effect of the separation higher, a noise shielding layer is formed in the substrate. Moreover, the arrangement of the respective surfaces is thought out so as to keep the circuit acting as the noise generation source and the circuit sensitive to the noise away from each other.

However, the base station, when including the new noise sources such as LCD, a switch, a hard disc drive and the like, further requires the countermeasure against the noise. Thus, this further requires the noise reduction, such as the shielding of a module that is susceptible to receive the noise.

As the third object, the lower electric power consumption of the sensor node is mentioned. At present, since the intermittent operation is controlled by a micro computer, the electric power of about 2 to 30 mA is consumed by the micro computer even during the standby. If the intermittent operation is controlled outside the micro computer, there is a possibility that the electric power consumption can be reduced.

So, in this invention, the hardware configuration of the sensor node and the base station is shared, thereby making the design easier and minimizing the delay of the response performance. Also, the removal of the noise makes the effective reception sensibility higher. Moreover, the lower electric power is attained because the control of the intermittent operation is carried out outside the micro computer. Consequently, the practical sensor net system having the high communication reliability and the long life of the sensor node is provided in the short period and at the low cost.

The typical features of this invention are as follows. For the first object, as the RF module of the base station, the hardware configuration of the sensor node is used in its original state for the wireless section (base station wireless section). The portion between the base station wireless section and the base station controller is connected through, for example, the serial interface and the like. When the space diversity is performed, it can be attained by creating and connecting two of the same elements.

Also, in order to minimize the time until the base station returns the response (ACK) and the command after receiving the data from the node, by storing a table in which the command to the node is stored in a memory of the base station wireless section, an unnecessary communication is protected from being generated between the base station wireless section and the base station controller.

Next, for the second object, the sensor node is used for the base station wireless section for being physically separated from the noise source such as the micro computer or the LCD, and the sensor node is further shielded.

For the third object, the electronic apparatus of this invention has an external RTC and the micro computer, in addition to the RF module, the power source, the sensor and the like, which are necessary elements. When at the intermittent operation, it enters a dormant state, the power sources of the RF chip and the sensor are turned off, and a start time is set for the external RTC, and the micro computer is set at the standby state. Consequently, the consumption of the current results only from the operation of the external RTC and the micro computer in the standby state. Upon starting, the signal of the external RTC is received as an interruption and consequently, the electronic apparatus starts.

According to this invention, it is possible to provide the sensor node having the practical operational life, in which the electric power consumption is reduced.

BRIEF DESCRIPTION OF THE DRAWING

The present invention can be appreciated by the description which follows in conjunction with the following figures, wherein.

DETAILED DESCRIPTION OF THE PREFERRED EMBODIMENTS

First Embodiment

Figure 1:
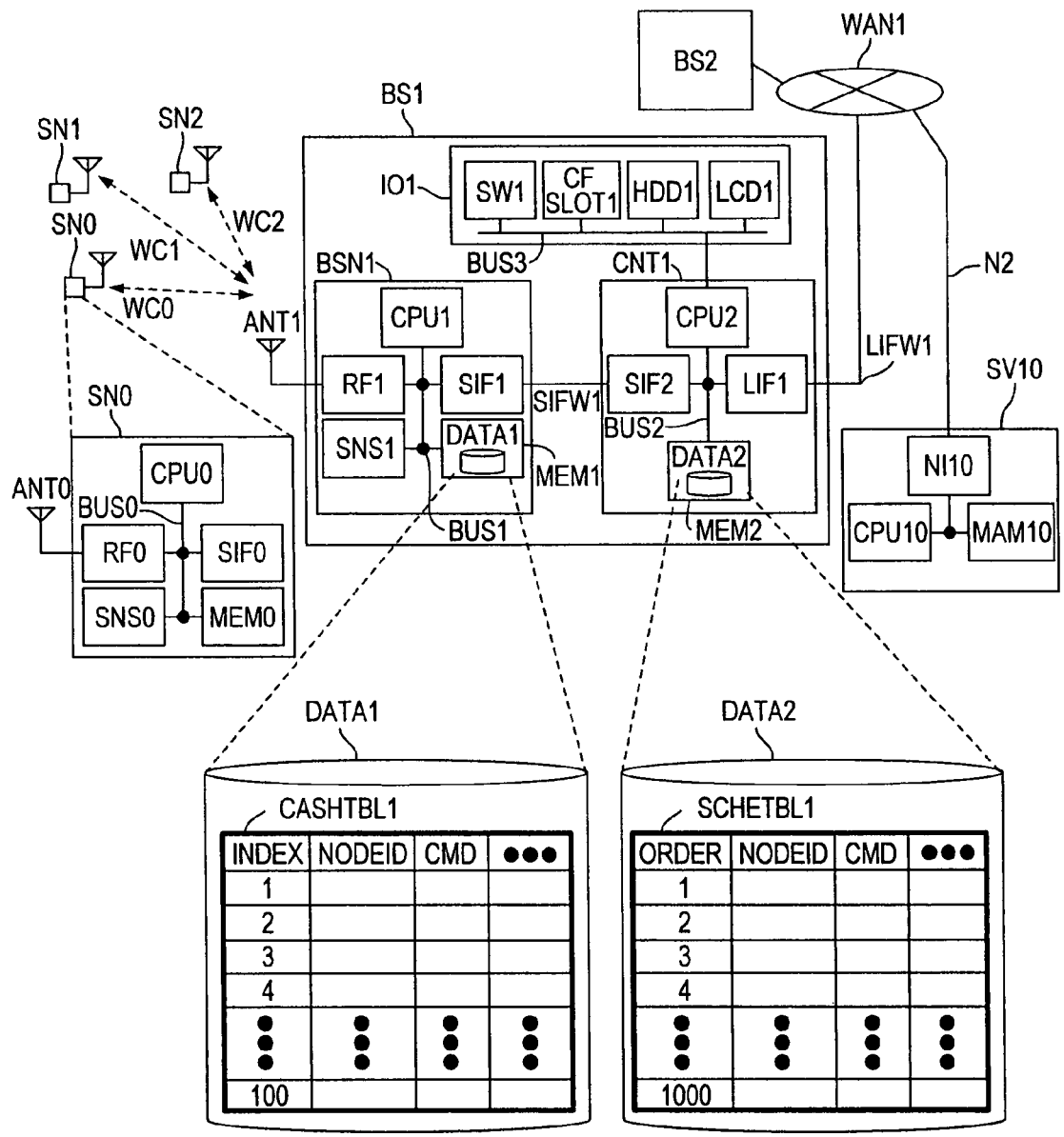
FIG. 1 is a diagram showing one embodiment of a sensor net where a sensor node is used in a base station wireless section.

FIG. 1 shows one example of a communication system. The communication system is provided with: a plurality of wireless terminals SN0 to SN2 each having a sensor function; base stations BS1 and BS2; an internet WAN1; and a server SV10. The wireless terminals SN0 to SN2 and the base station BS1 are connected through wireless communications WC0 to WC2. The portion between the base station BS1 and the internet WAN1 is connected through a wired communication LIFW1. The internet WAN1 and the server SV10 is connected through a wired communication N2.

As the flow of information, there are roughly two kinds. One is such that a sensor node obtains the data of a temperature, an acceleration, an illuminance and the like through a sensor and transmits it through the base station to the server on the internet. The other is such that the server sends the command for setting the conditions such as a communication frequency to the base station and the server.

Figure 18:
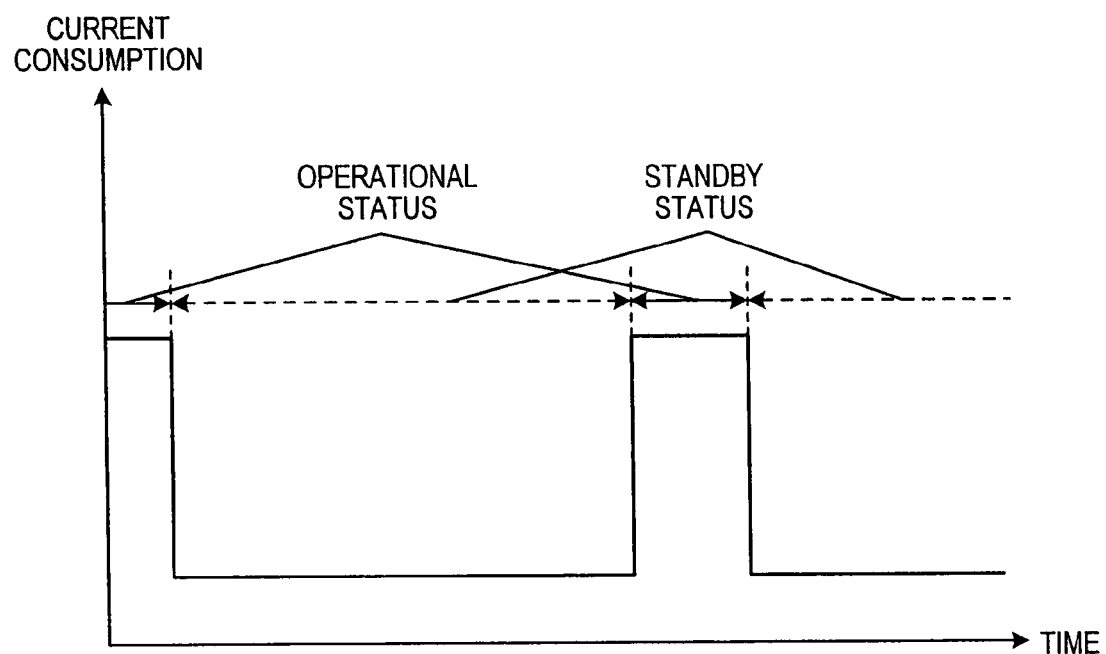
FIG. 18 is a diagram showing an intermittent operation of the sensor node.

Typically, the sensor node carries out the sensing at a predetermined interval (for example, once for each five minutes) and the communication with the base station. The sensor is in the standby state with small electric power consumption except during the operational state where the sensing or communication is carried out, in order to reduce the electric power consumption and extend the life. FIG. 18 shows the electric power consumption of the sensor node in the operational state and in the standby state. In the standby state, the power sources of a wireless chip and the sensor are turned off. For this reason, the sensing and the communication cannot be performed. Thus, in order to transmit a command and the like from the base station to the node, the command must be transmitted from the base station when the node is in a state capable of reception. In order to efficiently carry out this, the base station is required to grasp when the node is in a reception state.

For example, a protocol is considered where immediately after the node transmits a data, the reception state is set, and the base station sends a reception check of the data (hereafter, referred to as ACK) and the command. Also at that time, if the base station designates the time when the node carries out the next communication, the base station can control the transmission times of the respective nodes. Consequently, it is possible to disperse the transmission times and avoid the collision between the communications and consequently reduce the electric power consumption of the node. The assignment of the appearance times of those nodes is referred to as a scheduling. If this method is used, there is the possibility of the collision between the communications in the transient stage until the establishment of the communication with all of the nodes after the start of the base station. However, once the communication is established, all of the nodes can transmit the data systematically in order, without any collision. In this case, as the factor that disturbs the scheduling, a case may be conceived in which the node not only transmits the periodical data but also reports an emergency event such as a detection of disaster or bad health. As the other factors resulting from the state of the node, there are a case where the movement of the node causes a poor communication state with the base station, and a case where operation is impossible because the battery is exhausted, and other cases.

The transmission and reception of the data between the sensor node, the base station BS and the server SV10 can be attained if each device includes, for example, modules and functions which will be described below.

The sensor node SN0 includes a wireless communication module RF0, a controller CPU0, a memory MEM0, a sensor SNS0 and an interface controller SIF0.

Figure 2:
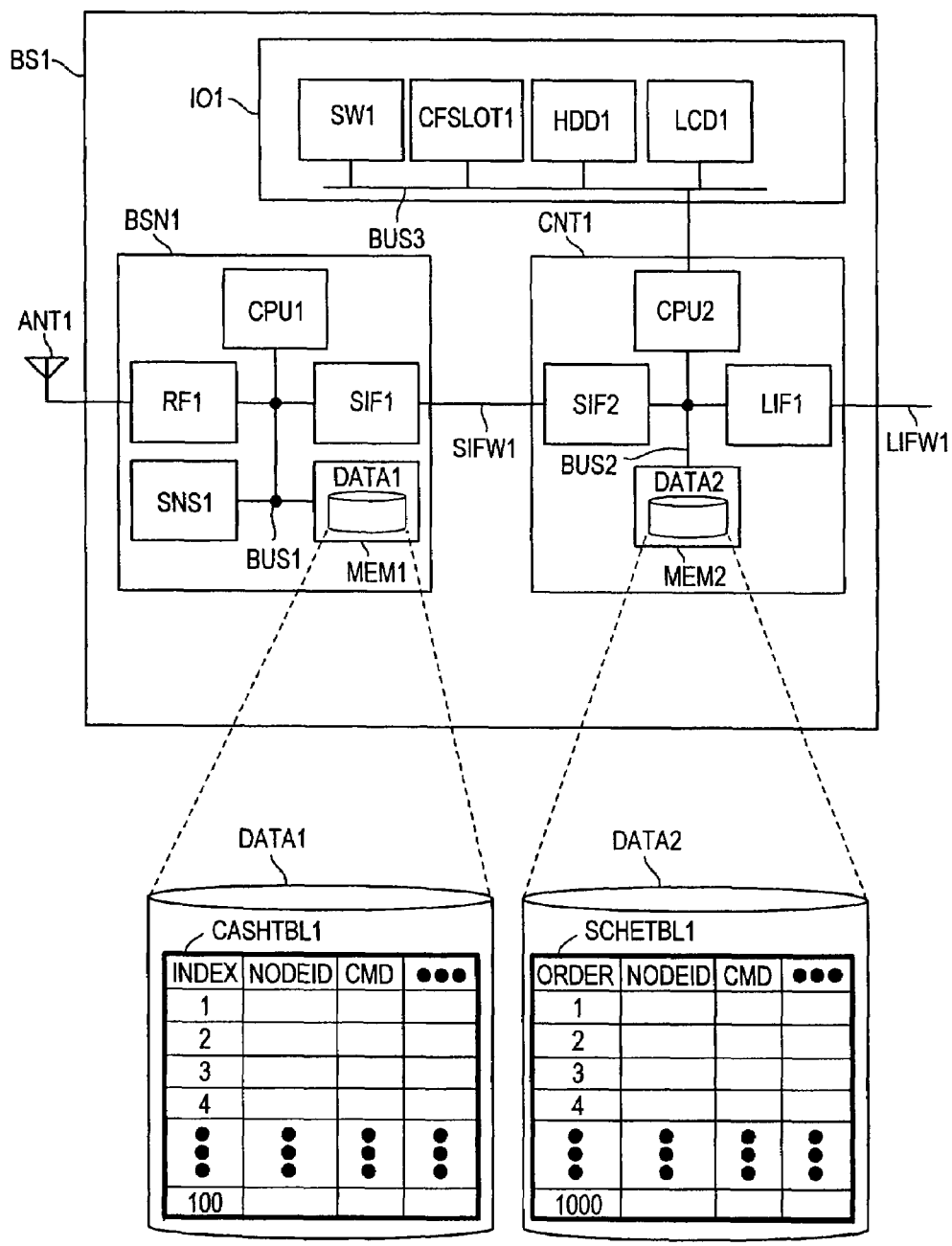
FIG. 2 is a diagram showing one embodiment of a base station where the sensor node is used in the base station wireless section.

In the base station BS1, as shown in detail in FIG. 2, there are a hardware (hereafter, referred to as a base station wireless section) BSN1 constituted by the same hardware as the sensor node, and a base station controller CNT1 for carrying out the management of the sensor node and the scheduling and the communication with the WAN1. Both of them are connected, for example, through a serial interface SIFW1, and in interface controllers SIF1 and 2, the data from both of them are transmitted and received. Various peripheral input output devices IO1 are further connected to the base station BS1. As the peripheral input output devices, for example, a switch SW1, a memory interface CFSLOT1 of a compact flash and the like, a hard disc drive HDD1, a liquid crystal display LCD1 and the like are connected.

In the base station wireless section BSN1, mainly, the data wirelessly received from the sensor nodes SN1 to SN3 are converted into digital signals by a wireless communication module RF1 and transmitted to the base station controller CNT1. Conversely, the command received from the base station controller CNT1 is wirelessly transmitted to the sensor nodes SN1 to SN3. On the other hand, the base station controller CNT1 transmits the data received from the base station wireless section BSN1, namely, the data received from the sensor nodes SN0 to SN3 through the wired communication LIFW1 to the server SV10, or conversely transmits the data received from the server SV10 through the wired communication LIFW1 to the base station wireless section BSN1.

A data DATA2 of the memory MEM2 of the base station controller CNT1 stores a table (scheduling table) SCHETBL1 for storing a scheduling result of the node. A program for carrying out a communication between the main controller CNT1 and the base station wireless section BSN1, a program for carrying out a communication between the main controller CNT1 and the internet WAN1, a program for carrying out the scheduling, and the like are further included in the MEM2.

The interface controller SIF1 is the module for transmitting and receiving the information to and from the outside of the base station wireless section, in the base station wireless section BSN1. As the external interface, for example, the serial interface and the like are typically known. The interface controller SIF1 converts the data on an inner bus BUS1 into the serial interface and outputs it to the SIFW1, or conversely outputs the data obtained from the SIFW1 to the inner bus BUS1.

The interface controller SIF2 is the module for transmitting and receiving the information to and from the outside, in the base station controller CNT1, similarly to the SIF1. The interface controller SIF2 carries out the control and conversion of the data between the SIFW1 and the BUS2.

In this way, the development of the hardware of the sensor node and base station is made easy by the hardware configuration that can be used not only in the sensor node but also in the base station, according to which each of the sensor node and the base station is provided with the wireless communication module RF0, the controller CPU0, the memory MEM0, the sensor SNS0 and the interface controller SIF0. For example, it is possible to reduce the development man-hour, the tuning man-power of the wireless performance, the verification man-power, the requisite authentication man-power and the like. Not only the hardware but also the software for controlling the base station wireless portion can be shared, thereby making the development easy. While this embodiment is designed such that the sensor node and the base station have the same configuration, if the development man-hour, the tuning man-power of the wireless performance, the verification man-power, the authentication man-power and the like can be reduced, the configuration can be naturally changed.

Figure 5:
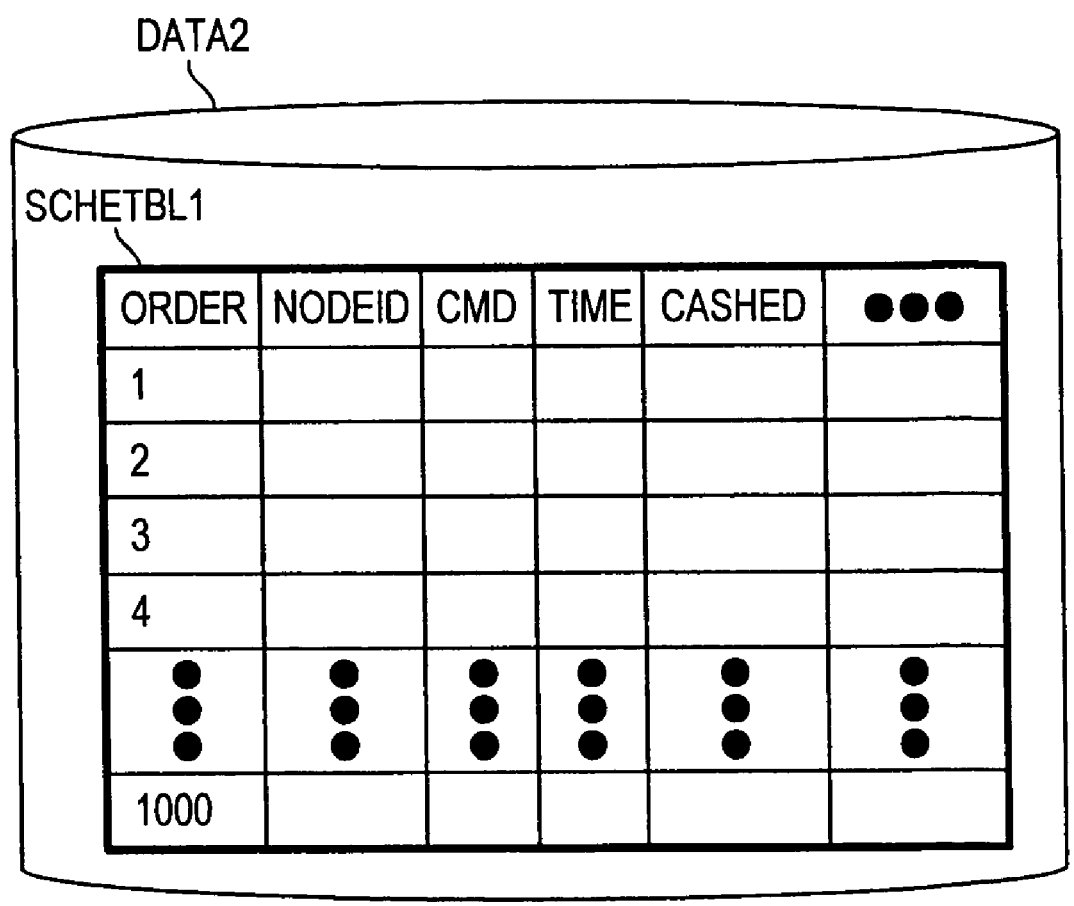
FIG. 5 is a diagram showing one embodiment of a scheduling table stored in a memory of a base station controller.

The minimization of the response time of the base station to the access of the sensor node will be described below. As shown in FIG. 5, in the scheduling table SCHETBL1, the sensor node whose connection to the base station BS is already reserved and the command and data that are desired to be transmitted to its terminal are arrayed and stored in the order of an appearance schedule. For example, the row whose ORDER is 1 is the row with regard to the sensor node whose appearance is scheduled to be the first. An identification number (NODEID) of its sensor node, a command (CMD) to be sent to its sensor node, an appearance time (TIME) of the sensor node, and a flag (CASHED) indicating whether or not the data concerned is a data stored in a cache table CASHTBL which will be described later. The CMD includes the setting request of a communication frequency and the like, the designation of a time when its sensor node appears next, and the like. The row whose ORDER is 2 is the sensor node whose appearance is scheduled to be the next. After that, the third, fourth to 1,000-th sensor nodes are stored.

Figure 4:
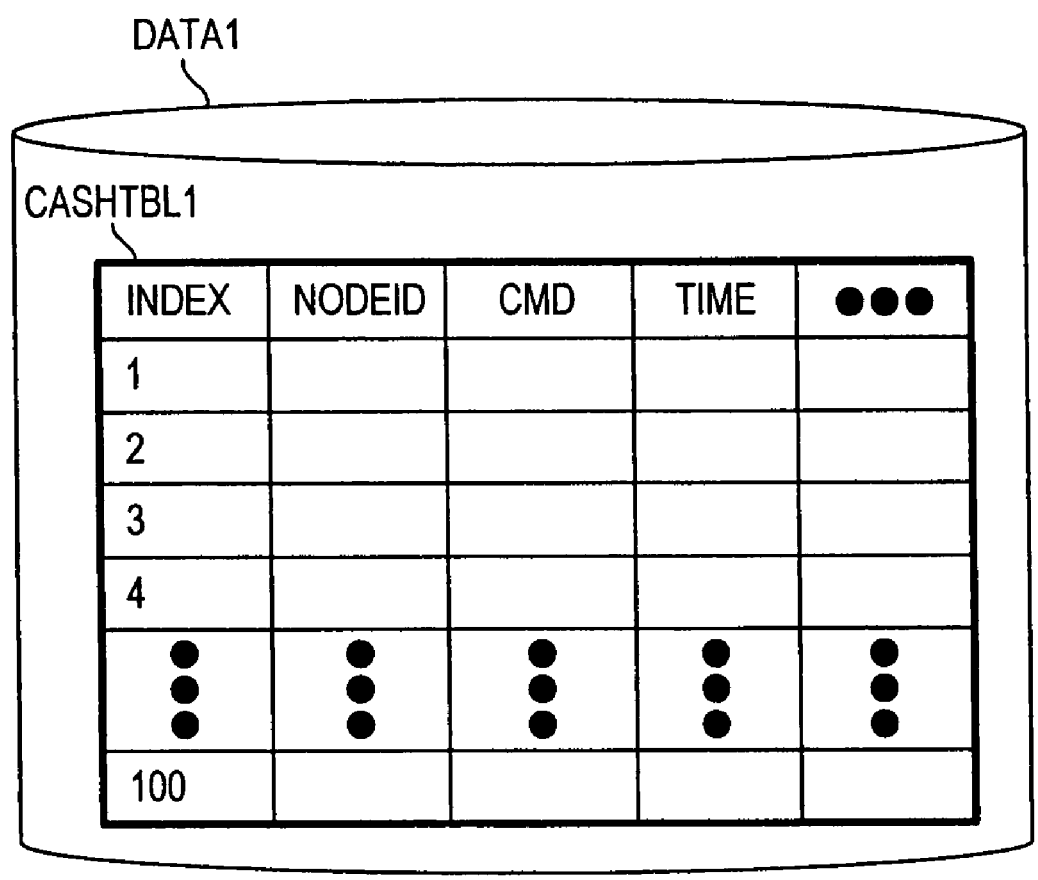
FIG. 4 is a diagram showing one embodiment of a cache table stored in a memory of the base station wireless section.

On the other hand, the cache table CASHTBL1 is stored in the data DATA1 of the memory MEM1 of the base station wireless section. FIG. 4 shows it in detail. The cache table CASHTBL1 stores the information with regard to the sensor node whose appearance is scheduled to be in the nearest future. That is, from the data of the first INDEX to be stored in the scheduling table SCHETBL1, data of a volume that can be accommodated in the cache table, for example, data corresponding to 100 pieces of data is stored. The cache table CASHTBL1 stores the identification number (NODEID) of the sensor node, the command (CMD) to be sent to the sensor node and the appearance time (TIME) of the sensor node. At the time of the start, the data does not exist in the cache table. The capacity of the cache table CASHTBL1 depends on the specifications and precision of the node. If the node transmits the data surely at the specified time, only the command with regard to the node that will next appear may be cached. On the contrary, if there is a variation in the precision of the transmission time of the node or there exists a node that irregularly transmits the data, the commands corresponding to the certain number of the nodes are required to be cached.

In this way, for the object of the minimization of the response time of the base station, by storing the list table of the commands to the nodes in the memory of the base station wireless section and removing the unnecessary communication between the base station wireless section and the base station controller, it is possible to minimize the increase in the electric power consumption of the node. In particular, it is possible to attain a cache whose hit rate is high, by storing the data in the cache table by using the appearance time of the sensor node that can access the base station, without storing the data in the cache by using the access frequency as in the conventional cache method.

In the above-mentioned description, the command CMD to be transmitted to the sensor nodes SN1 to SN3 is stored in the cache table CASHTBL1. However, as another executing method, a method may be conceived in which the command itself is not stored, and a flag CASHED indicating whether or not the command exists in the SCHETBL1 is given. When the flag is ON, the actual command and data exist in the scheduling table SCHETBL1. Thus, after the check of the flag CASHED, if the flag is ON, the base station wireless section BSN1 is required to request the command and data to the base station controller CNT1 and obtain them. If the flag is OFF, the response can be immediately returned to the sensor node, and no excessive delay is generated.

In this embodiment, if the flag is ON, the base station wireless section BSN1 is required to request the base station controller CNT1 for the data, and the base station controller CNT1 is required to transmit it to the base station wireless section BSN1. Thus, a corresponding delay occurs. However, the advantage of using this embodiment is the ability to save the memory of the cache table CASHTBL1. For example, if the command of 128 bytes is transmitted, when the command itself is stored in the cache table, a total of 128 bytes is required. However, when only its presence or absence is stored as the flag, only one bit is required.

Figure 3:
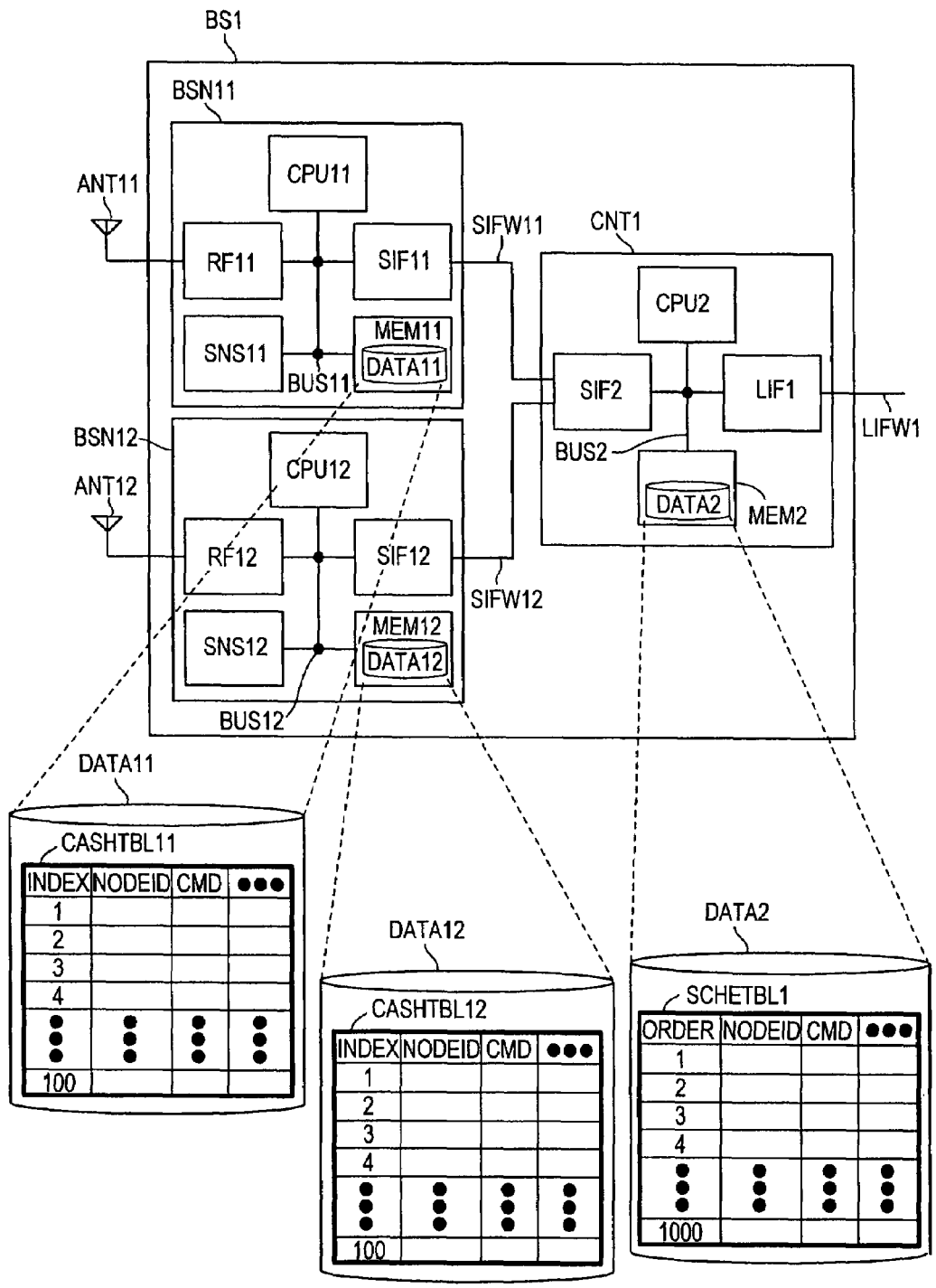
FIG. 3 is a diagram showing one embodiment of the base station where the sensor node is used in the base station wireless section.

In FIG. 3, the base station BS1 includes therein two base station wireless sections BSN11 and BSN12. The base station wireless sections BSN11 and BSN12 and the main controller CNT1 are connected through, for example, serial interfaces SIFW1 and SIFW2.

In order to improve the reliability of the communication under sever electric wave propagation environments, a method of using two antennas and using the better one of the data is referred to as a space diversity. By including the two RF sections as mentioned above and using the data excellent in reception sensibility, it is possible to attain the space diversity.

In this case, by giving the same cache table to the BSN11 and BSN12, the base station controller CNT1 takes the initiative in matching the data of both of the tables.

Figure 6:
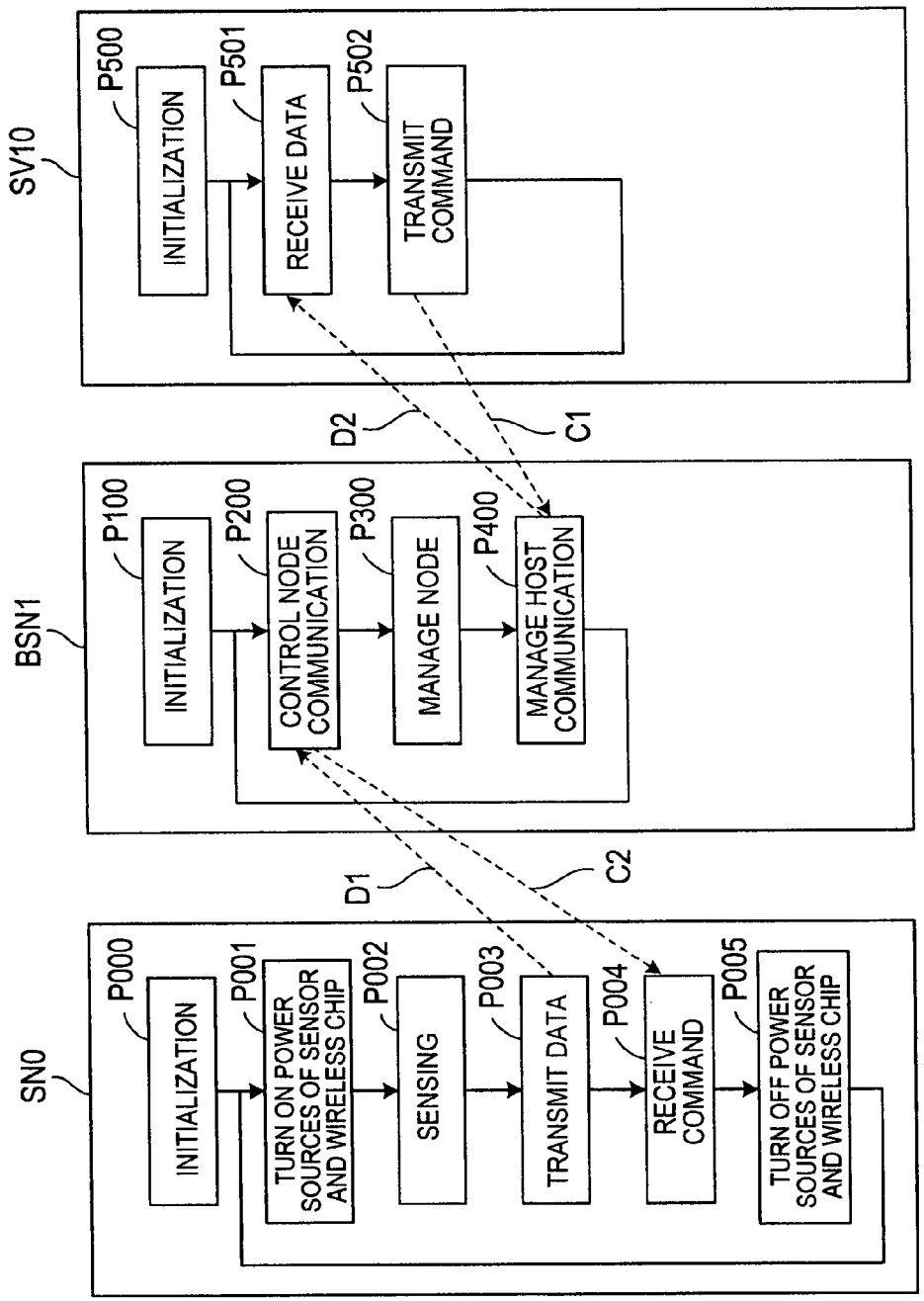
FIG. 6 is a diagram showing one example of flows of operations and data of the sensor node, base station, and server in the sensor net of FIG. 1.

FIG. 6 is a diagram showing one example of the flow of the operations and data of the sensor node, base station and server in the sensor net of FIG. 1.

In the sensor node SN0, an initialization P000 is firstly performed. The initialization carries out the setting of the wireless frequency, the setting of the transmission electric power, the settings of the sensing interval and the transmission interval, and the like. Next, the power source is supplied to the sensor for sensing the data of the temperature and the like, and the wireless chip for transmitting and receiving the data, at P001. After that, a sensing P002 is carried out to store the data in the memory MEM0. After that, at P003, the data is transmitted through a wireless communication D1 to the base station BS1. Then, after a wait in the reception state, at P004, the command from the base station BS1 is received through a wireless communication C2. After that, the power supply to the sensor and wireless chip is stopped to shift to a low electric power mode. Then, upon startup after the set sensing interval and transmission interval, and the operation is resumed from the P001. In this embodiment, the timing when the transmission/reception can be carried out between the base station BS1 and the sensor node SN0 is only the timing when the base station BS1 is at the node communication control state. However, the interruption and the like can be used to make the priority of this communication higher.

The base station BS1 firstly carries out the initialization P100. The initialization carries out the setting of the wireless communication, the setting of the transmission electric power, the setting of the communication rate with the server SV10, and the like. After that, the communication with the node is carried out at a node communication control P200, which will be described later by using the drawings. Here, the sensing data sent from the node is received. Also, the command sent from the server SV10 is transferred to the node.

Next, a node management P201 is carried out, which will be described later by using FIG. 9. Here, the scheduling and the generation of cache data are executed.

Lastly, a host communication management P202 is carried out, which will be described later by using FIG. 10. Here, the data transmission/reception is carried out to and from the server SV10 on the network WAN1 connected through the wired LIFW to the base station BS1. The sensing data received from the node SN0 is received through the wireless communication D2, and the command from the server is received through the wireless communication C1.

Lastly, the server SV10 firstly carries out the communication setting on the network WAN1 at an initialization P500 and then repeats a transmission P501 and a reception 502 of the data to and from the base station. In this embodiment, the timing when the transmission/reception can be carried out between the server SV10 and the base station BS1 is the timing only when the base station BS1 is in the host communication management state. However, the interruption and the like can be used to make the priority of this communication higher.

Figure 7:
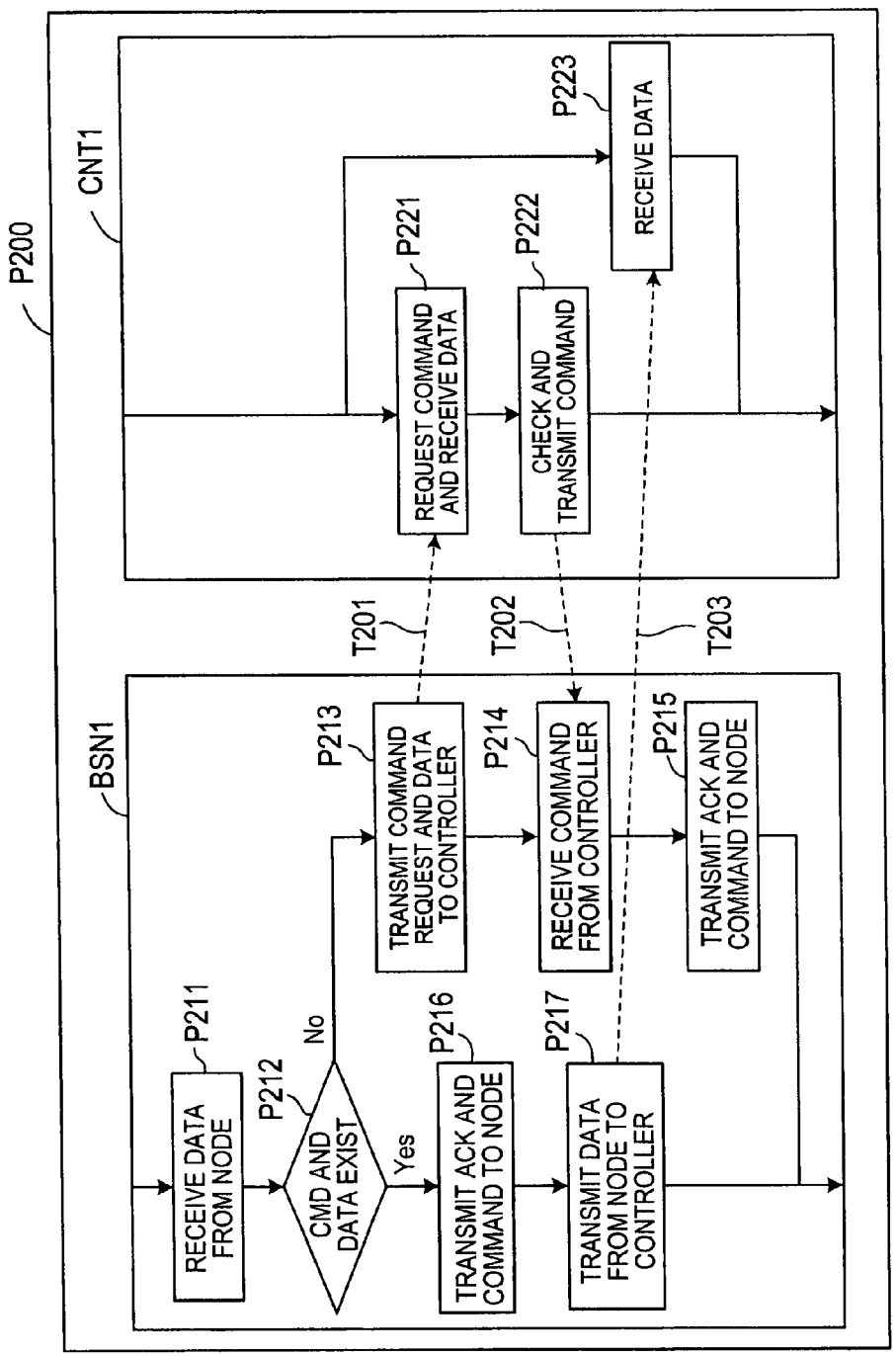
FIG. 7 is a diagram showing flows of operations and data of a node communication controller in the base station of FIG. 6.

FIG. 7 shows in detail a node communication controller P200. Upon receiving the data from the sensor node at P211, the base station wireless section BSN1 firstly examines NODEID inside the cache table CASHTBL at P212 and checks whether or not there is the corresponding row.

If there is the corresponding row, at P216, the command and ACK in the cache table is transmitted to the sensor node SN0. After that, at P217, the sensing data received from the node is transmitted to the base station controller CNT1. The data is received by the base station controller CNT1 at P223.

On the other hand, if the corresponding row does not exist in the cache table, at P213, the sensing data and a command request T201 are transmitted to the base station controller CNT1. The base station controller CNT1 receiving the request at P221 examines whether or not the command to the node requested at P222 exists in the scheduling table and responds at T202.

Figure 8:
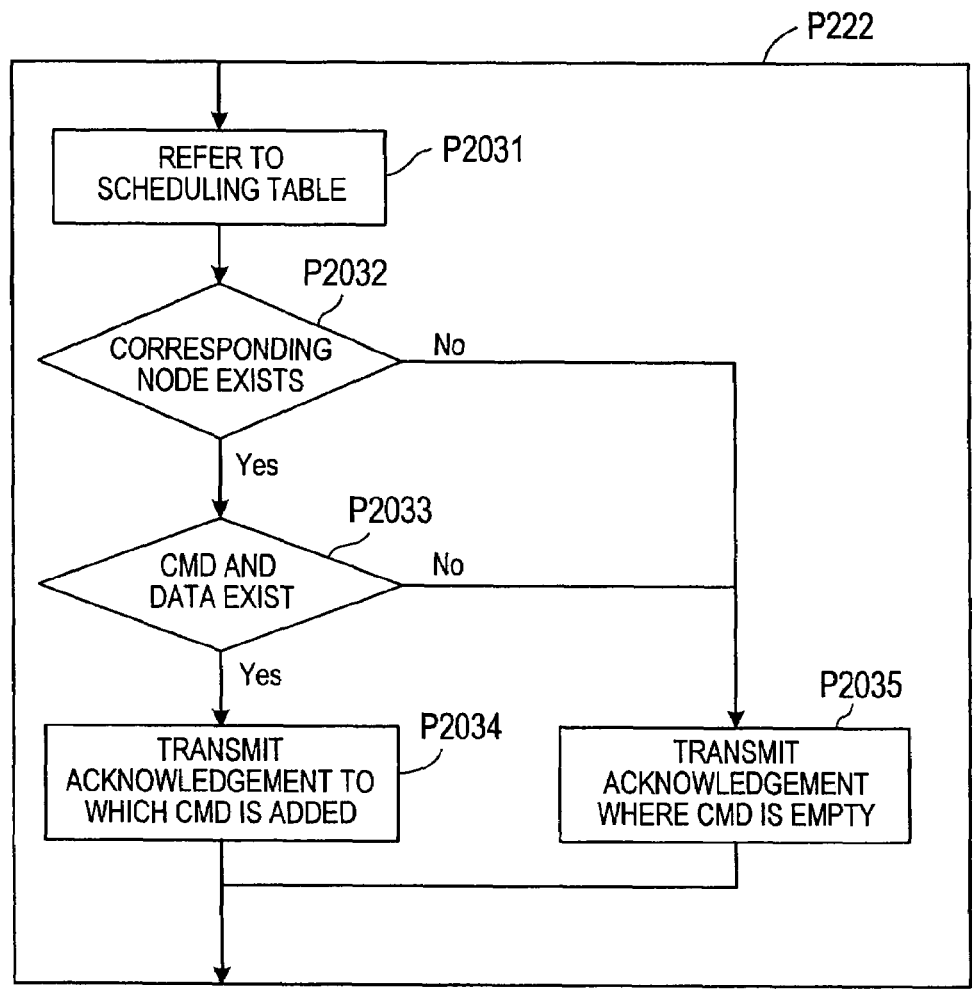
FIG. 8 is a diagram showing a command check of the base station and an operation of a transmitter of FIG. 7.

The details of P222 are shown in FIG. 8. The base station controller CNT1 receiving the command request refers to NODEID of the scheduling table SCHETBL at P2031.

In a judgment at P2032, if there is no row having the corresponding NODEID, at P2035, a data T202 in which the command CMD is empty (NULL) is transmitted to the base station wireless section BSN. This corresponds to the case of the first access to the base station BS1 by the sensor node SN0 and the case of the deletion thereof from the SCHETBL1, which is caused by movement, time-out or the like, in spite of the previous access.

In the judgment at P2032, the existence of the row having the corresponding NODEID indicates the case of the appearance earlier than a scheduled time which is caused by an emergency event, although the scheduling was already performed because of the previous access. In this case, the existence of the CMD is judged at P2033.

In the case of non-existence, likewise, at the P2035, a data T202 in which the command CMD is empty (NULL) is transmitted.

In the case of existence, at P2034, the data T202 to which the CMD is added is transmitted. The base station wireless section BSN1 receiving the data T202 at P214 transmits the ACK and the CMD included in the received data T202 to the node SN0 at P215. Then, the communication between the node SN0 and the base station BS1 is completed.

Figure 9:
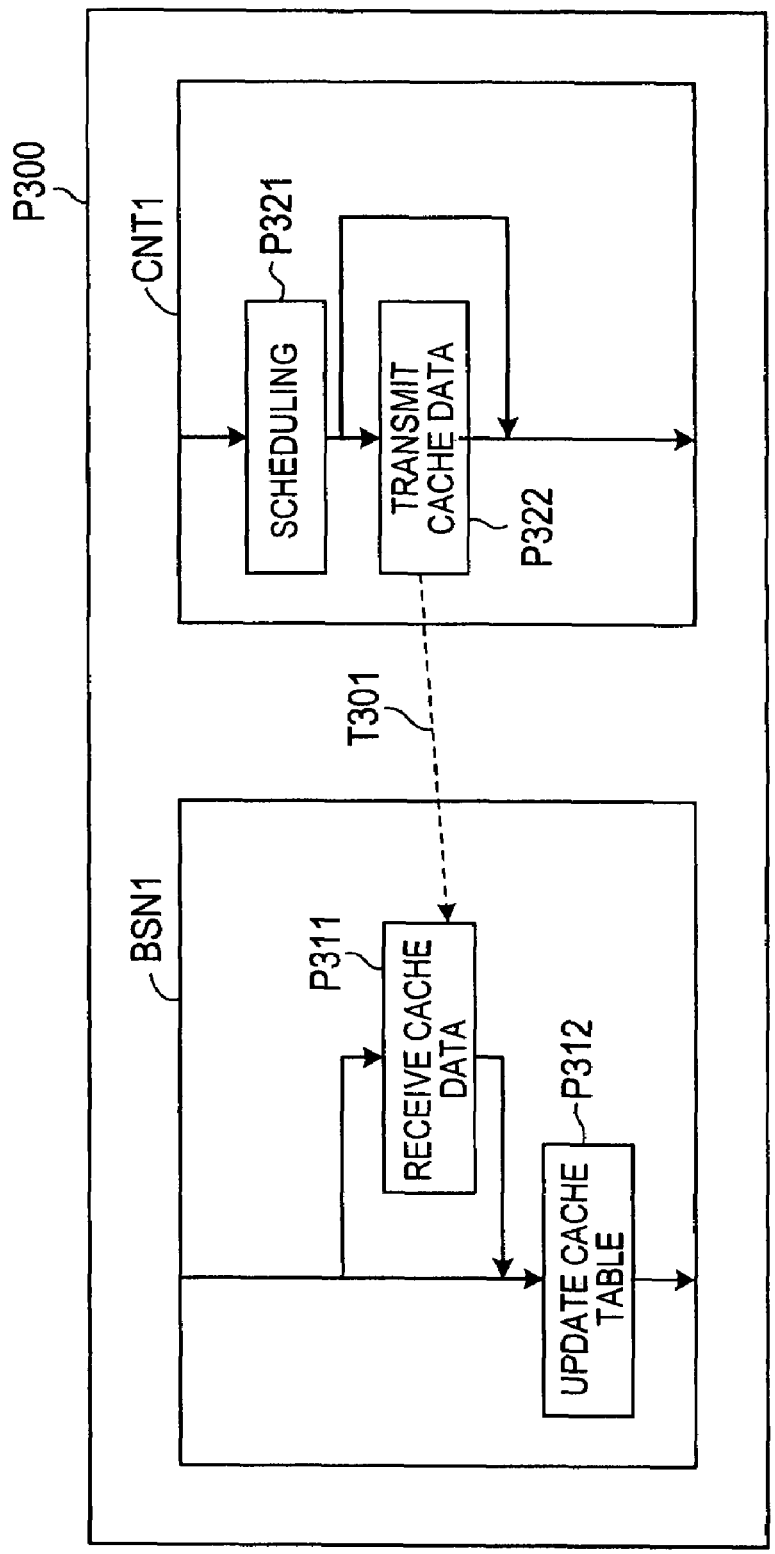
FIG. 9 is a diagram showing a flow of operations and data of a node manager in the base station of FIG. 6.

Next, FIG. 9 shows the details of a node manager P300 of FIG. 6. The base station controller CNT1 carries out a scheduling P321 in accordance with the communication result with the node SN0. If the corresponding node did not exist in the scheduling table SCHETBL in the judgment of P2032, it is registered in the scheduling table SCHETBL. The registration location is the row next to a row having the largest order ORDER, in which when the next appearance designation time included in the command CMD sent to the node SN0 is compared with TIMEs of the respective data in the SCHETBL, the next appearance designation time does not exceed the TIMEs.

In the judgment of the P2032, if the corresponding node existed in the scheduling table SCHETBL, the corresponding row of the scheduling table SCHETBL is deleted, and the row corresponding to the next appearance schedule is registered. The registration location is similar to that described above.

Also, when the appearance schedule time TIME is examined, the data with regard to the node whose appearance schedule time TIME exceeds the current time by a certain time is removed. This may be the case of the state where the corresponding sensor node cannot communicate with the base station BS1 because of the exhausted battery or the movement thereof.

Also, the base station controller CNT1 can know which data is cached and the number of data currently cached, by setting the flag CASHED, if the row next scheduled to appear is stored in the cache table CASHTBL. By recording the total number of the data that can be stored in the cache table CASHTBL in advance, it is possible to determine the number of the storable data. Consequently, in the order from the data of smaller ORDER in the scheduling table SCHETBL, the additionally storable data is transmitted to the base station wireless section at P322.

On the other hand, the base station wireless section receives a cache data T301 at P311. After that, the cache table CASHTBL is updated at P312. Here, similarly to the base station controller CNT1, the appearance schedule time TIME is examined, and the data with regard to the node whose appearance schedule time TIME exceeds the current time by the certain time is deleted from the cache table CASHTBL. Moreover, the cache data T301 received at P311 is added to the cache table CASHTBL.

Also, as the timing and method of updating the cache table, there are also other methods. In the method of FIG. 9, the base station controller CNT1 calculates the empty space of the cache table CASHTBL of the base station wireless section BSN1 and transmits a new data. Moreover, for example, there is a method that jointly uses a device for requesting the base station controller CNT1 to transmit the new data, when the base station wireless section BSN1 manages the empty space of the cache table CASHTBL and if there is an empty space available and no other communication or work is performed. If communication takes place between the base station wireless section BSN1 and the base station controller CNT1 each time a slight empty space is produced in the cache table CASHTBL, it takes a long time to establish the communication, and there is a possibility that the work efficiencies of the base station wireless section BSN1 and base station controller CNT1 become poor. On the contrary, the efficiency is made higher by using the method where, as mentioned above, the base station wireless section BSN1 takes the initiative in performing collective transfer after an empty space is generated to some degree in the cache table CASHTBL.

Figure 10:
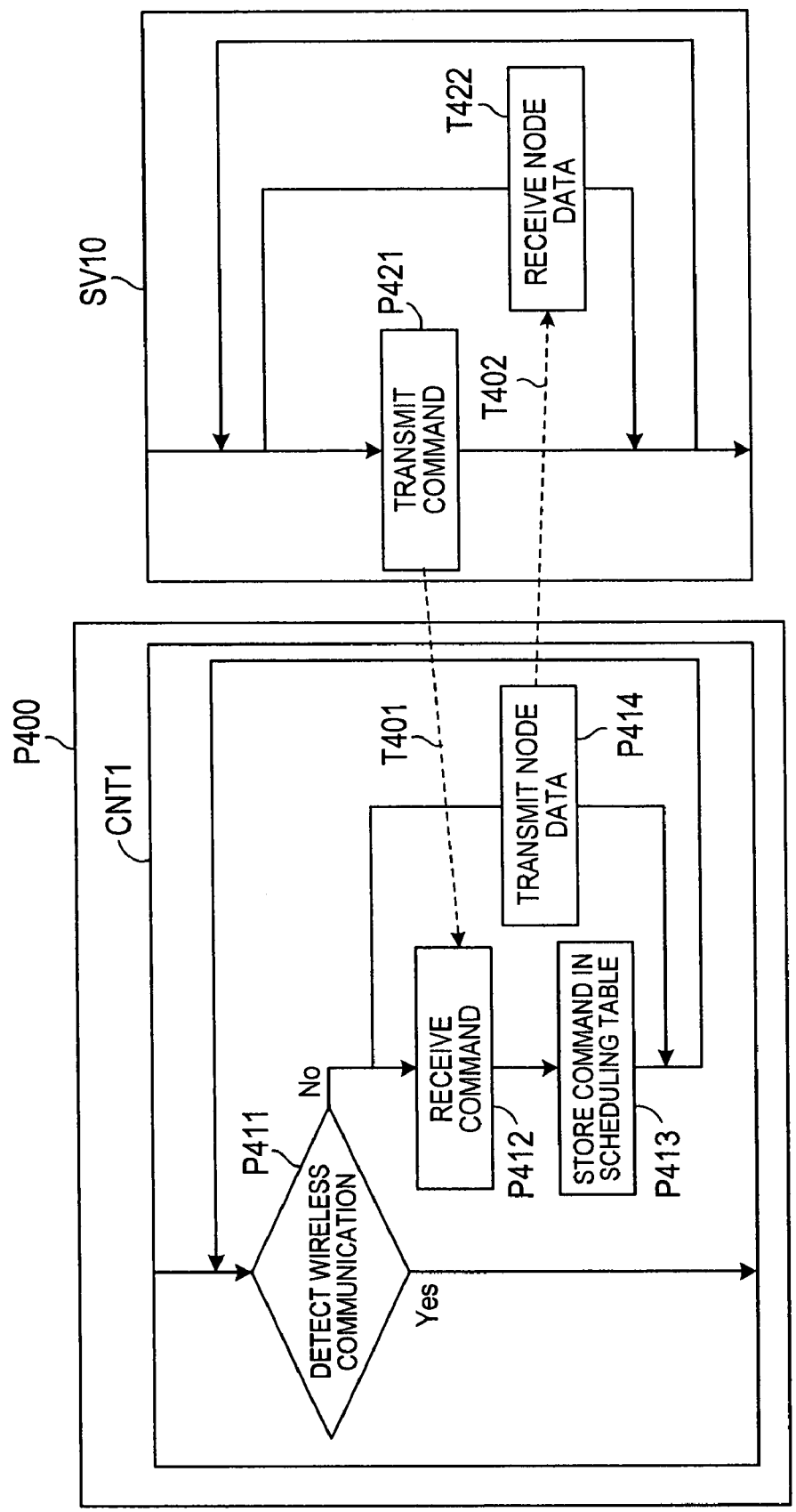
FIG. 10 is a diagram showing a flow of operations and data of a host communication manager in the base station of FIG. 6.

Next, FIG. 10 shows the details of a host communication manger P400 of FIG. 6. In the base station controller CNT1, the communication is carried out between the base station BS1 and the server SV10. In the communication, there are the communication to transmit the data transmitted from the nodes SN0 to SN3 to the server SV10 and the communication to transmit the command from the server SV10 to the nodes SN0 to SN3.

Upon confirming that there is no wireless communication at P411, the base station controller CNT1 establishes the communication with the server SV10 and carries out a reception 412 of the command and a transmission 414 of the data.

When the command is received, it is added to the CMD of the corresponding node in the scheduling table SCHETBL. There is also a method in which, if there is no corresponding node, the fact of the non-existence is reported to the server SV10, or nothing is done. Also, there is a method in which, if also the server SV10 carries out the scheduling of the node, its result is added to the scheduling table.

In correspondence with the above, the server SV10 carries out a transmission P421 of the command and a reception P422 of the data.

Figure 11:
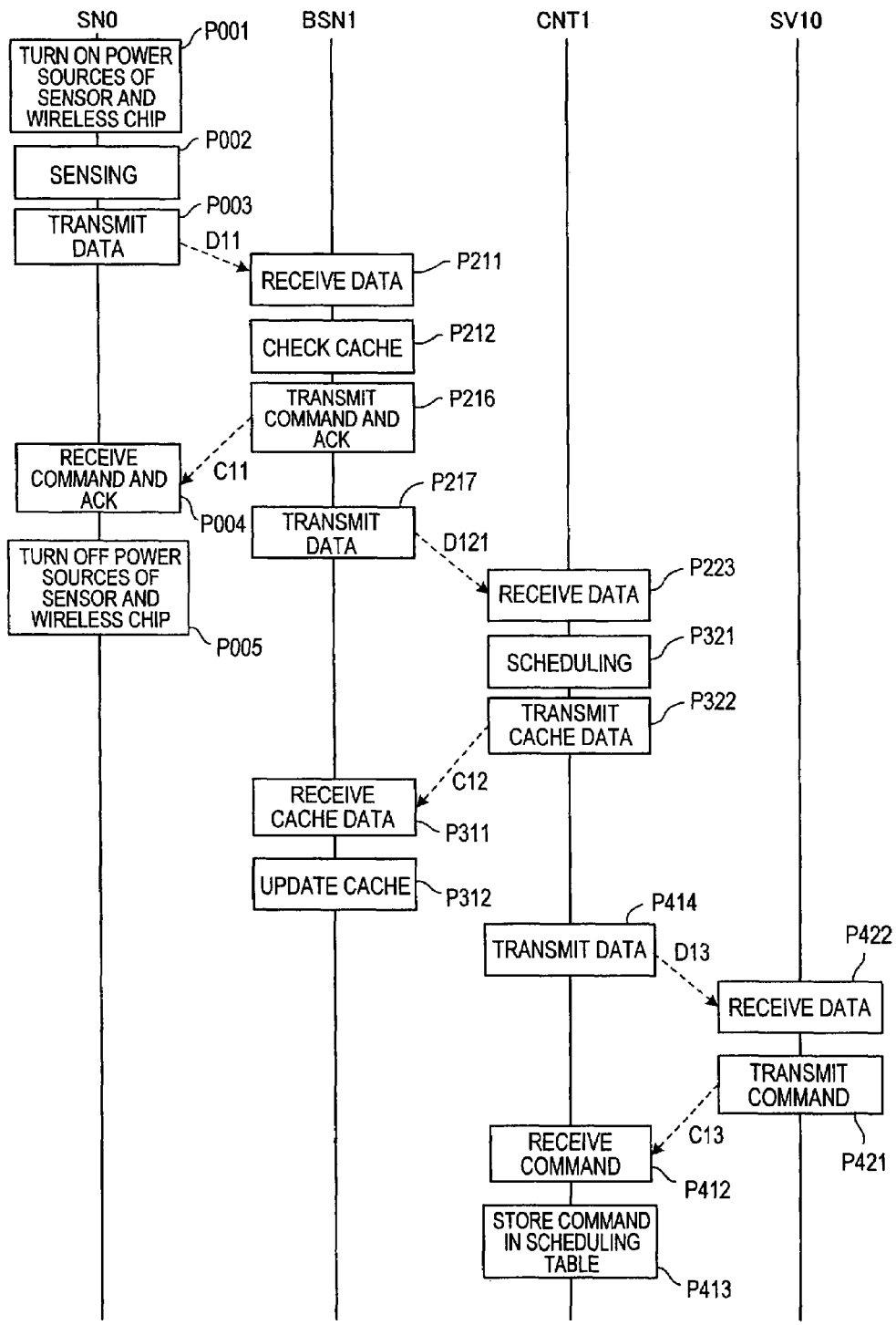
FIG. 11 is a diagram showing one example (having a cache) of an operation sequence in the sensor net of FIG. 1.
Figure 12:
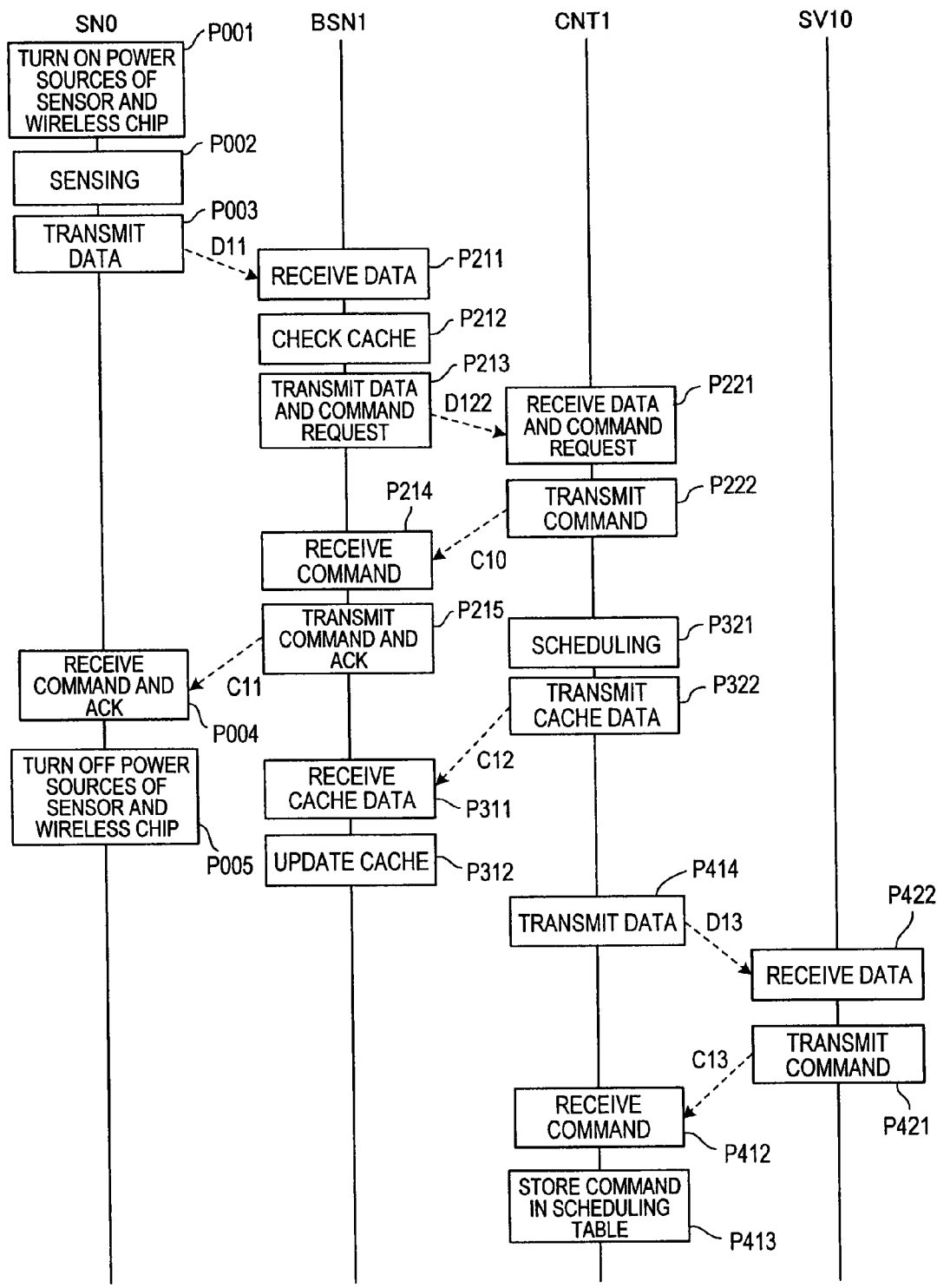
FIG. 12 is a diagram showing one example (having the cache) of the operation sequence in the sensor net of FIG. 1.

FIG. 11 and FIG. 12 show examples of the operations of the node SN0, base station wireless section BSN1, base station controller CNT1 and server SV10, which are explained in FIG. 6 to FIG. 10.

FIG. 11 and FIG. 12 each show the respective operations of the node, base station wireless section BSN1, base station controller CNT1 and server SV10 in the stated order from the straight line on the left-hand side of the drawings. Each straight line extending from the top to the bottom of the drawings indicates the passage of time. The dotted lines between respective straight lines indicate the flow of the data. Also, the numbers of the respective operations of the drawings correspond to the same numbers of FIG. 6 to FIG. 10.

FIG. 11 shows the case where the command to the node SN0 transmitting the data is cached in the cache table CASHTBL of the base station wireless section BSN1. The node SN0 turns ON the power source at P001, and carries out the sensing P002 and then transmits a data D11 at P003. The base station wireless section BSN1 receives the data D11 at P211 and checks whether or not the command to the node exists in the cache table CASHTBL at P212. In the case of the existence, at P216, the command CMD of that row is added to the ACK and replied to the node. The node receives it at P004 and turns OFF the power source at P005. After sending the ACK to the node, the base station wireless section BSN1 transmits the data received at D11 to the base station controller CNT1 at P217. The base station controller CNT1 receives it at P223.

The operation then proceeds to a node manager P300, and a scheduling P321 is executed. Here, the row corresponding to the node now receiving data is temporarily deleted from the scheduling table SCHETBL, and by taking into account the time of the next appearance of the node, this is added to a new order ORDER. Also, the appearance schedule time TIME of each node in the scheduling table SCHETBL is examined, and if it abnormally exceeds the current time by a certain time, the row is deleted.

Next, the empty space of the cache table CASHTBL of the base station wireless section BSN1 is calculated and transmitted at P322. At least a component corresponding to one node that has transmitted the data just now is known to be empty. Also, the component corresponding to the row deleted because of the excess of the appearance schedule time TIME is known to be empty.

The base station wireless section BSN1 receives it at P311 and updates the cache table CASHTBL at P312. The updating deletes the row with regard to the arrived node, similarly to the above-mentioned case, and also deletes the component whose appearance schedule time TIME exceeds the current time by a certain time or more.

Also, at P414, the base station controller transmits the data received at D121 to the server SV10. The server SV10 receives the data at P422. Also, at P421, the command to the node is transmitted. The base station controller CNT1 receiving it at P412 reflects it in the scheduling table SCHETBL at P413.

FIG. 12 shows the case where the command to the node SN0 transmitting the data is not cached in the cache table CASHTBL of the base station wireless section BSN1.

The operation until the check of the cache at P212 after the reception of the data from the node is similar to that of FIG. 11.

After that, if there is no command to the corresponding node, the currently-received data and the command request to check the presence or absence of the command are transmitted to the base station controller at P213. The base station controller CNT1 receiving it at P221 checks the scheduling table SCHETBL and transmits the command CMD at P222. The details are as explained in FIG. 8.

The base station wireless section BSN1 receiving it at P215 transmits a data C11 added to the ACK at P217 to the node. The node receives it at P004 and then turns off the power source at P005.

A comparison between FIG. 12 and FIG. 11 reveals the following. That is, in FIG. 11, the base station wireless section BSN1 can reply the ACK immediately after the check of the cache, and the node can turn OFF the power source. However, in FIG. 12, the communication between the base station wireless section BSN1 and the base station controller CNT1 is generated once, and the node is required to turn ON the power source for a correspondingly longer time.

Here, one example of the effect achieved when the cache table is given to the base station wireless section and the above-mentioned control method is employed is estimated.

The communication between the node SN0 and the base station BS is assumed as follows. The data to be sensed and transmitted is assumed to be 9 bytes. For example, as the information of a temperature sensor, it may be typically 2 or 3 bytes. Supposing that the information of two or three kinds of sensors is inputted and that the sensing data corresponding to several times is sent at once. Moreover, the time when it is sensed is added. On the other hand, the data to be transmitted to the node from the base station is assumed to be equal in size. This stores the command, the schedule time of the next transmission, and the like.

Supposing that at the time of the transmission, a preamble of 7 bytes to identify the communication is added thereto. This includes a packet length, an identifier of the node and the like.

Typical wireless systems require about 50 ms in order to wirelessly transmit and receive the information of 128 bytes. Thus, information of 16 bytes is considered to require about 6.25 ms for transmission and reception. Thus, if the data corresponding to the cache table CASHTBL of the base station wireless section BSN1 exists, it is instantly replied, and the time while the node is active becomes about 6.25 ms. Strictly speaking, the time to retrieve the cache is added to this. However, it corresponds to several clock cycles of the CPU, and it is several μs at most. Hence, it is negligible.

On the contrary, if the data corresponding to the cache table CASHTBL of the base station wireless section BSN1 does not exist, the time of the interface SIFW1 communication between the base station wireless section BSN1 and the base station controller CNT1 is added. The transfer rate on this SIFW1 is assumed to be 19.2 kbps which is used in the typical system. In this case, when the data flowing through this is assumed to be 9 bytes, namely, 72 bits, 72/19200=0.00375, and the time becomes 3.75 ms. The communication is required to be executed in two ways between the base station wireless section BSN1 and the base station controller CNT1. Thus, it takes 7.5 ms that is double the above time. When the time of 6.25 ms in the case of the immediate reply as determined above is added, the time becomes a total of 13.75 ms. In short, two times or more of the time required in the case of the immediate reply is required. Hence, the time for which the node must wait for the reception becomes two times or more.

When the node is in the reception wait state or transmission state, a current of about 30 mA always flows. On the contrary, at the time of the standby state, it is about several μA in the micro computer and the wireless chip, and the entire current is about 30 μA at most.

A case is considered in which transmission is performed once for each five seconds. When it hits on the cache, the electric power necessary for the transmission and reception is 6.25 ms×30 mA=0.19 mAs, and the electric power necessary for the standby is 5 s×30 μA=0.15 mAs. Then, the consumption of a total of 0.34 mAs is adequate. If it does not hit on the cache, the electric power necessary for the transmission and reception is 13.75 ms×30 mA=0.41 mAs, and the electric power necessary for the standby is 5 s×30 μA=0.15 mAs. Then, a total of about 0.56 mAs is consumed. Thus, this consumes nearly twice the electric power. In this case, the life of the node is reduced to nearly half.

Second Embodiment

A second embodiment of this invention relates to a method of improving the communication reliability of the base station and improving the communication distance.

Figure 13:
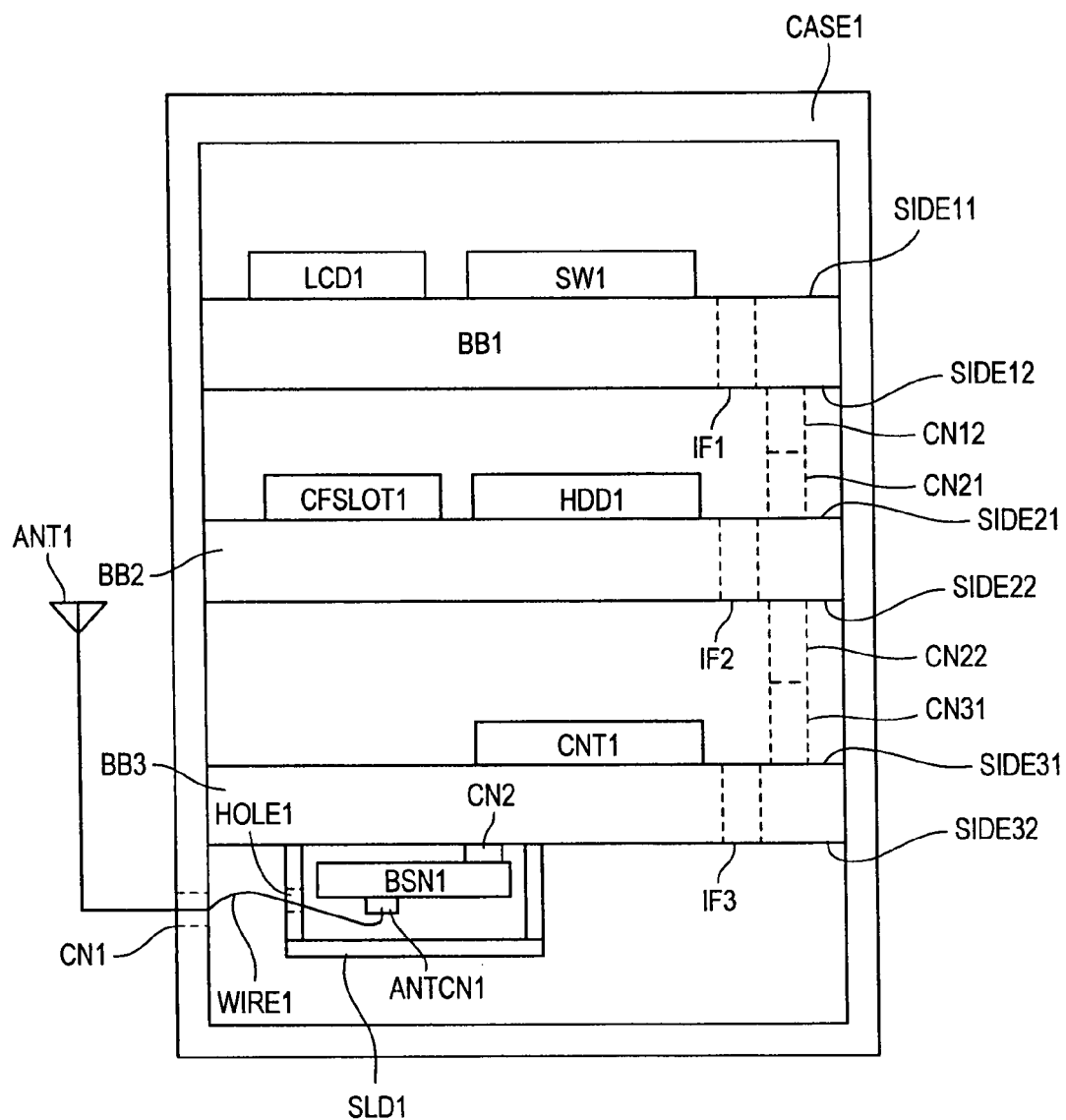
FIG. 13 is a diagram showing one example of hardware where the base station wireless section is shielded.

FIG. 13 shows the embodiment in which the base station wireless section BSN1 is shielded.

Figure 16:
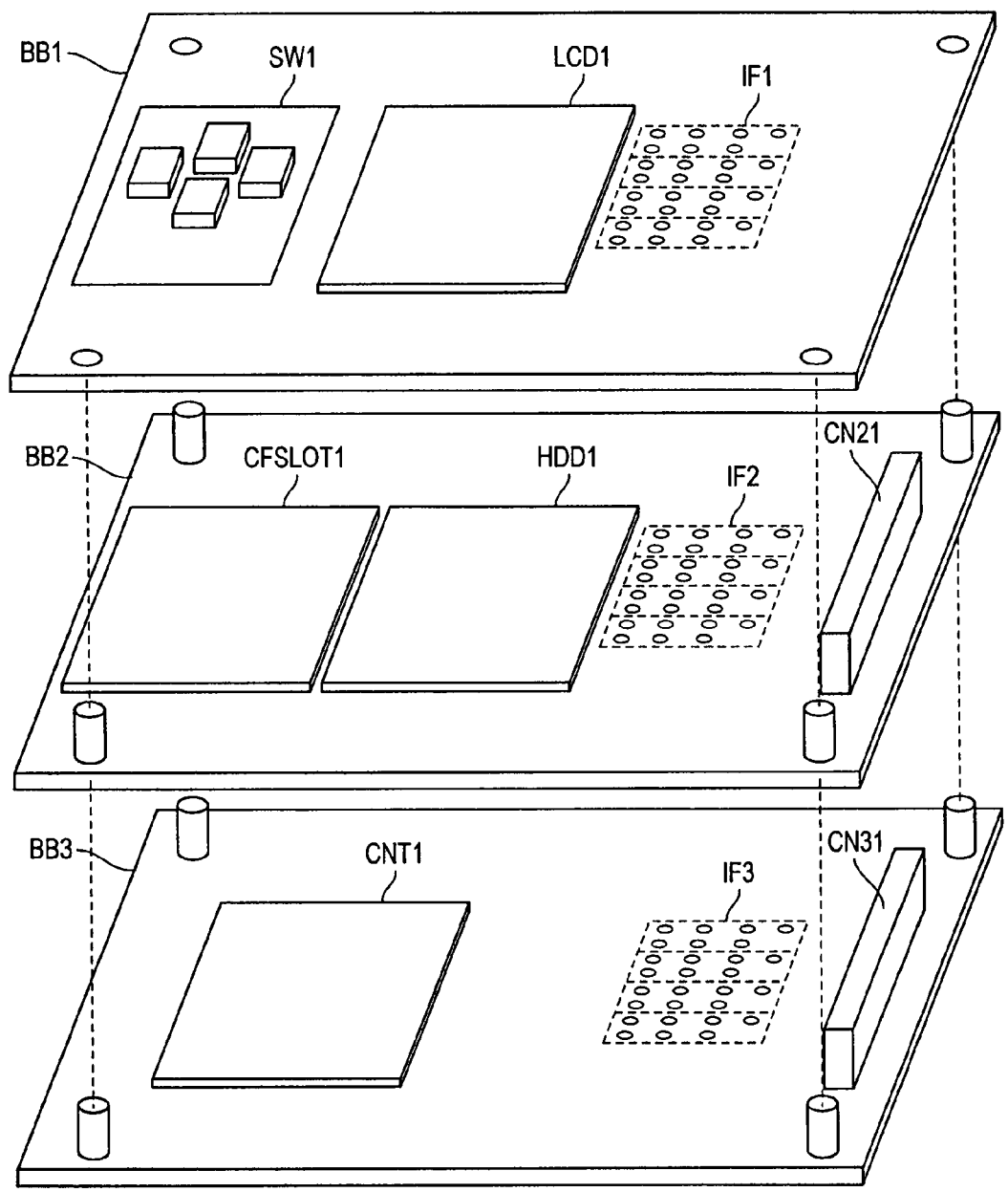
FIG. 16 is a diagram showing one example of hardware where three substrates are connected.

In this embodiment, the base station BS1 shown in FIG. 2 is mounted in three substrates BB1 to BB3. The substrates BB1 to BB3 are connected through communicable connectors CN12, CN21, CN22 and CN31 and fixed with a case CASE1. FIG. 16 shows a connection diagram of the three substrates. FIG. 13 is a sectional view in a vertical direction of the base station. Referring to FIG. 13, the detailed description will be made.

The devices, which act as generation sources of noises or do not receive the influence of the noise, such as a liquid crystal display LCD1 and a switch SW1 are placed on a surface SIDE11 of the substrate BB1. They and the substrate BB2, between which wirings are passed through an interface IF1 such as a via, are connected through the connectors CN12, CN21.

Also, a hard disc drive HDD1, a compact flash CFSLOT and the like are placed on the surface SIDE21 of the substrate BB2. There is no special difference between the substrates BB1 and BB2. However, the devices that are viewed or touched by a user are preferentially placed on the BB1. The substrates BB2 and BB3 are connected through the interface IF2 and the connectors CN22, CN31, similarly to the foregoing case.

The base station controller CNT1 is placed on a surface SIDE31 of the third substrate BB3. The base station wireless section BSN1 that is weakest against the noise is placed on a rear SIDE32 of the substrate BB3 located farthest from the other modules. The BSN1 and the CNT1 are connected through an interface IF3 and the connector CN2. Here, the BSN1 is shielded by a shield SLD1. An outer antenna ANT1 is connected to the connector CN1 on a case CASE1 such as a coaxial connector and further connected through a wire WIRE1 such as a coaxial cable to a connector ANTCN1 on the base station wireless section BSN1. The WIRE1 is passed through a hole HOLE1 made in a part of the shield SLD1. The connector similar to the CN1 may be connected on the shield SLD1, and this may be connected through it.

In this way, in the base station, the hardware of the sensor node is used to physically separate. Then, by shielding it, the signal of a digital circuit is prevented from being inputted to the input portion of the RF chip. Consequently, the high frequency wireless signal from the antenna can be normally demodulated, thereby improving the communication reliability and the communication distance.

Third Embodiment

Figure 14:
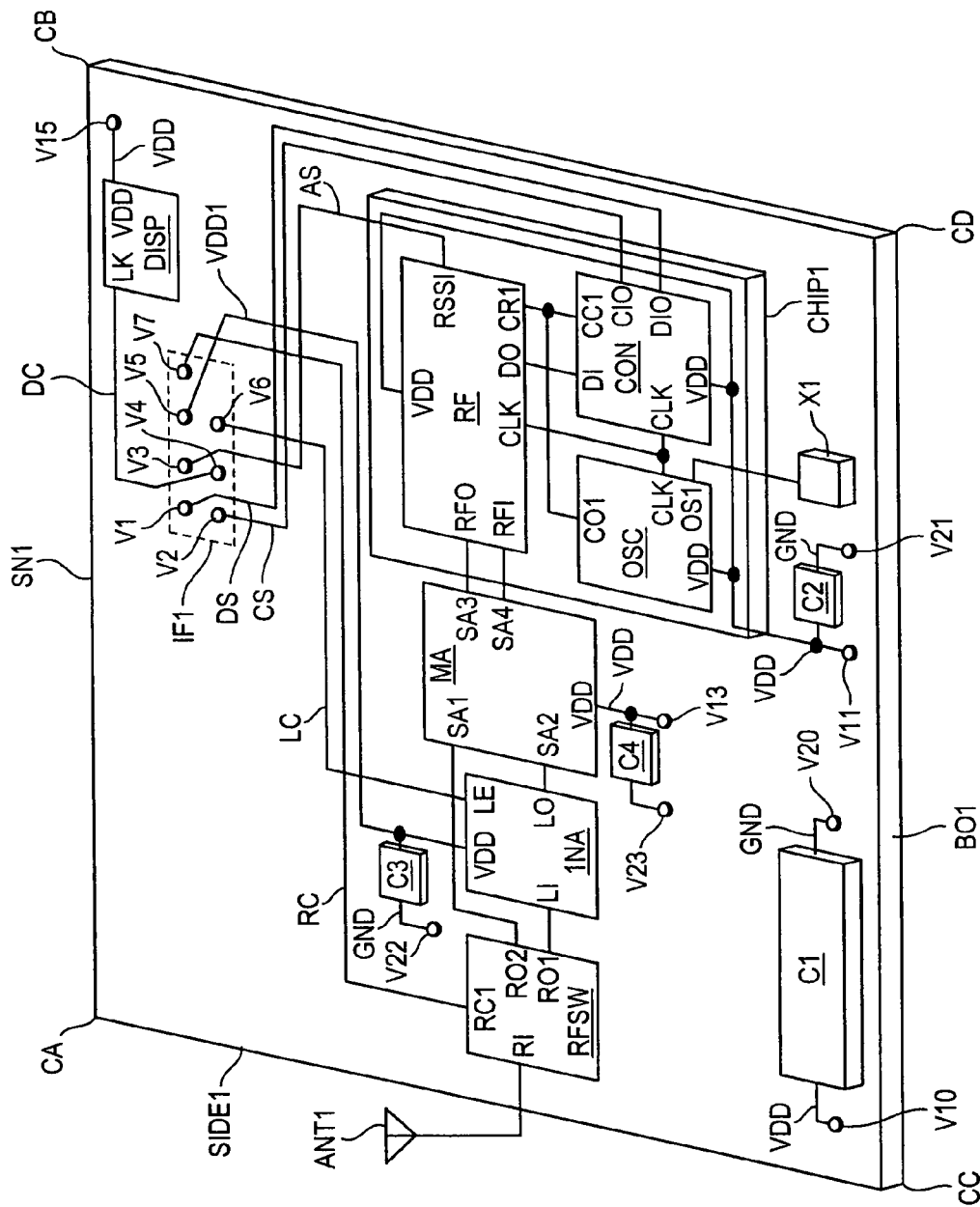
FIG. 14 is a diagram showing one example of a surface of hardware where a real time clock (RTC) is externally installed.
Figure 15:
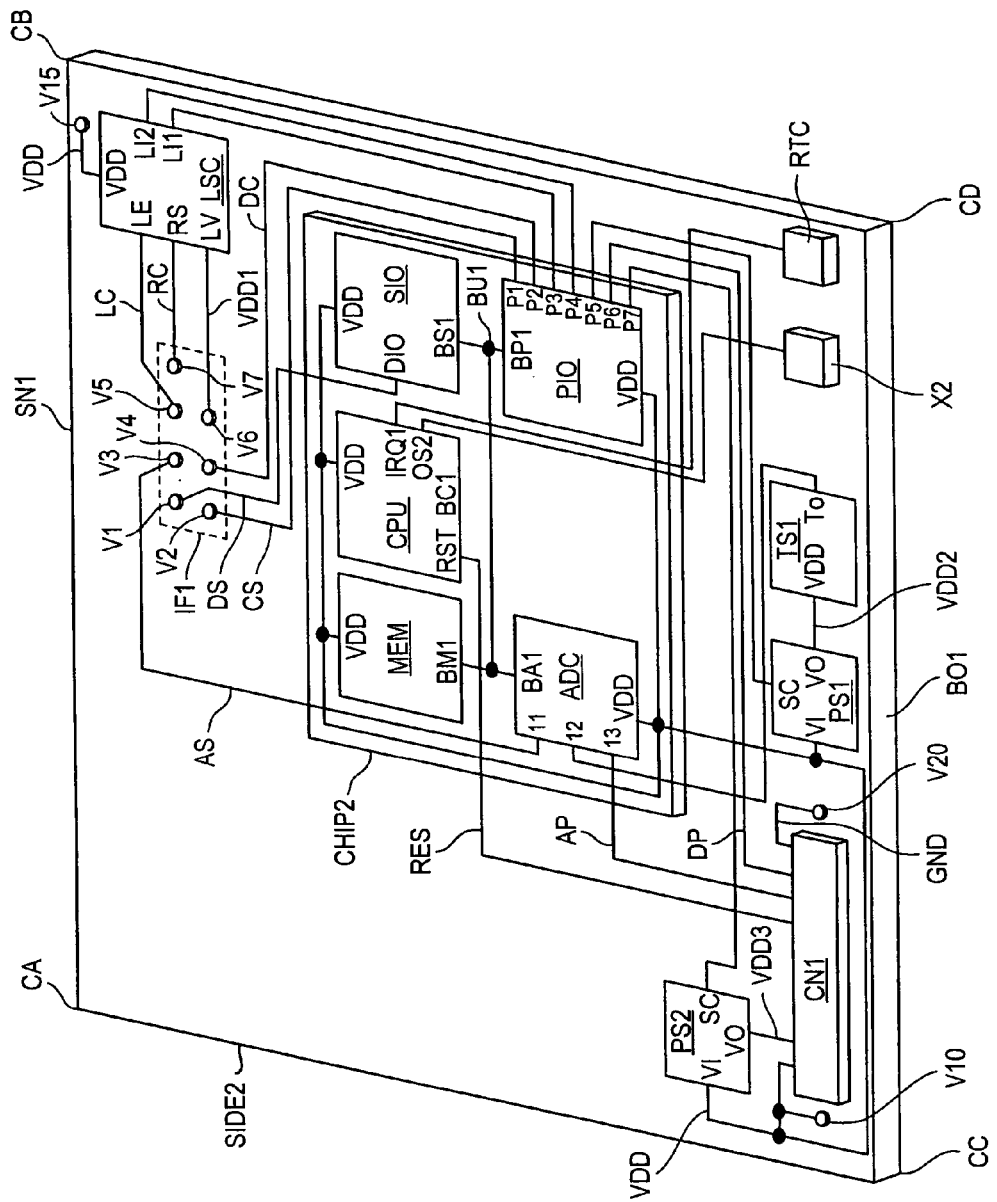
FIG. 15 is a diagram showing one example of a rear of the hardware where the real time clock (RTC) is externally installed.

A third embodiment of this invention relates to a method of further reducing the electric power consumption of the sensor node. FIG. 14 and FIG. 15 are views showing one example where a real time clock is installed outside the CPU.

FIG. 14 shows the state where the circuit constituting the sensor node SN1 is mounted on a surface SIDE1 of a substrate B01. FIG. 15 shows the state where the circuit constituting the sensor node SN1 is mounted on a rear SIDE2 of the substrate B01. As shown in FIG. 14, a high frequency signal process chip CHIP1 (hereinafter, referred to as "RF Chip"), a first crystal unit X1, a high frequency switch RFSW, a high frequency low noise amplifier LNA, a matching circuit MA, an interface IF1 to a circuit mounted on the rear SIDE2, a display DISP and condensers C1, C2, C3 and C4 are mounted on the surface SIDE1 of the substrate B01.

Further, as shown in FIG. 15, the rear SIDE2 is composed of a processor chip CHIP2, a connector CN1, first and second power source shutdown switches (PS1, PS2), a temperature sensor TS1 as an inner sensor, a second crystal unit (X2), a real time clock (RTC), a switch RFSW placed on the surface SIDE1, and an RFSW/LNA control circuit LSC for controlling the amplifier LNA through the interface IF1. Outer sensors, which are attached outside the substrate and placed inside the sensor node, for example, a temperature sensor, an acceleration sensor, a distortion sensor, are connected to the connector CN1. A ceramic resonator can also be used instead of the crystal unit.

The RF chip CHIP1 and the processor chip CHIP2 are connected through the interface IF1 to each other. The processor chip CHIP2 collects a sensor data from the inner sensor or through the connector CN1 from the outer sensor and passes the sensor data through the interface IF1 to the RF chip CHIP1. The RF chip CHIP1 converts the sensor data into a wireless signal and transmits the signal to the base station BS1 installed outside the sensor node SN1. The RF chip CHIP1 receives the wireless signal is received from the base station BS1. An external wireless terminal typically transmits the transmission request of the sensor data and the operational parameters such as the frequency of the wireless communication and the propagation rate. The data received by the sensor node SN1 is passed through the interface IF1 to the processor chip CHIP2 and then used for, for example, the setting in the subsequent wireless communication.

Referring to FIG. 15, the processor chip CHIP2 mounted on the rear SIDE2 of the substrate B01 will be described below. The processor chip CHIP2 includes a memory circuit MEM, a micro computer CPU, a data input/output circuit SIO, an A/D conversion circuit ADC and a programmable input/output circuit PIO. Those circuit blocks are coupled through an inner bus BU1 to one another, and the transmission/reception of the data and the control are executed.

The memory circuit MEM is composed of a non-volatile memory, such as Static Random Access Memory (SRAM) of a low electric power consumption or a flash memory. A software for attaining a control method specific to this invention (described later) is installed on the memory circuit MEM. The micro computer CPU controls different circuit blocks inside the processor chip CHIP2 based on the installed software and attains the desirable operation.

The data input/output circuit SIO is the input/output circuit for a serial data. This is used to send the sensor data to the RF chip CHIP1. The programmable input/output circuit PIO is the input/output circuit for a parallel data. This is mainly used to input and output a control data required to control the operational mode of the transmission/reception of the RF chip CHIP1.

Although the outer sensor is connected to the connector CN1, the outer sensor may be one for outputting an analog data or one for outputting a digital data. A sensor data AP of an analog type sensor is converted into a digital data by the AD conversion circuit ADC. For example, in the sensor node SN1, a temperature sensor TS1 of the analog type is mounted on the substrate B01, and the temperature data AT from the sensor TS1 is converted into a digital amount by the AD conversion circuit ADC and stored on the memory MEM if necessary. On the other hand, a sensor data DP of a digital type is inputted through the programmable input/output circuit PIO to the processor chip CHIP2 and stored on the memory MEM if necessary.

Further, the processor chip CHIP2 controls the RFSW/LNA control circuit LSC, turns on/off the power source of the amplifier LNA and executes the switching between the transmission and the reception of the high frequency switch RFSW. Moreover, the processor chip CHIP2 controls the power source shutdown switches PS1, PS2 and controls the on/off actions of the power sources of the temperature sensor TS1 and the outer sensors.

With reference to FIG. 14, the RF chip CHIP1 mounted on the surface SIDE1 of the substrate B01 will be described below. The RF chip CHIP1 is provided with a high frequency modulation/demodulation circuit RF, an oscillation circuit OSC and a control circuit CON. The sensor data DS sent from the processor chip CHIP2 is converted into a high frequency wireless signal RF0 of a predetermined frequency band (~315 MHz) by the high frequency modulation/demodulation circuit RF and transmitted to the external wireless terminal. The high frequency wireless signal from the external wireless terminal is received by the antenna ANT1 and demodulated by the high frequency modulation/demodulation circuit RF. The demodulated signal CS is passed through the interface IF1 to the processor chip CHIP2. The sensor node SN1 monitors a reception magnitude, and a signal AS indicating the reception magnitude is also passed from an RSSI terminal of the high frequency modulation/demodulation circuit RF through the interface IF1 to the processor chip CHIP2.

Also, the oscillation circuit OSC uses an oscillation frequency of the crystal unit X1 as a base and generates a clock signal necessary for the operation of the entire RF chip CHIP1 and a high frequency signal (carrier frequency signal) of a targeted wireless communication band.

Moreover, the high frequency modulation/demodulation circuit RF and the oscillation circuit OSC are controlled by the control circuit CON, on the basis of the control signal CS of the processor chip CHIP2. Concretely, the switching of the operational mode between the transmission and the reception, the slight adjustment of the frequency band of the transmission/reception signal, the transmission electric power, or the like are controlled. Moreover, the oscillation circuit OSC is stopped by the control signal from the processor chip CHIP2 so that the entire RF chip CHIP1 can proceed to the wait state. In this case, the electric power consumption of the RF chip CHIP1 can be typically reduced to 1 μA or less.

The operations and configurations of the other components are as follows.

The high frequency switch RFSW is controlled by the RFSW/LNA control circuit LSC installed on the rear SIDE2. The wiring between the antenna ANT1 and the RF chip CHIP1 is switched to realize the desirable transmission/reception operation. Concretely, at the time of the transmission, an RI terminal and an RO2 terminal of the high frequency switch RFSW is made conductive. Also, at the time of the reception, the RI terminal and the RO1 terminal are made conductive.

The amplifier LNA is installed outside the RF chip CHIP1 and amplifies the high frequency wireless signal, which is received by the antenna ANT1 and very weak, to the level at which it can be demodulated by the RF chip CHIP1. Here, the reason why the amplifier LNA is externally installed is to use the element produced by a process other than that of the RF chip CHIP1. For the sake of the lower cost and lower electric power consumption operation, the RF chip CHIP1 is desired to be composed of a CMOS circuit. However, on the other hand, the CMOS circuit has a problem in that a gate noise is severe, and this is poor at amplifying the weak high frequency wireless signal, so, as the amplifier LNA, a circuit produced by a process that is not CMOS compatible and externally installed is used. The amplifier LNA is desired to be made of, for example, a compound semiconductor of GaAs, SiGe, or a bipolar circuit, in view of the amplification performance. The high frequency wireless signal received by the antenna ANT1 is inputted to an input terminal LI of the amplifier LNA, amplified by a predetermined amplification factor and then outputted through an output terminal LO. The amplification factor of the amplifier LNA is desired to be about 10 to 20 dB, if the stable communication is desirably executed at the communication distance of about 10 mm in a 315 MHz band. Also, the amplifier typically has a large consumption current. Thus, by controlling an enable terminal LE, the operation state and the wait state can be switched, thereby enabling the consumption current at the time of the wait state to be typically reduced to about 10 µA. However, if the sensor node SN1 always consumes the current of 10 µA, this has severe influence on the battery life. Hence, this embodiment is configured such that the control from the processor chip CHIP2 shuts down the power source supply to the amplifier LNA. Therefore, it is possible to attain the lower electric power consumption of the sensor node SN1.

The matching circuit MA is the circuit for matching an input/output impedance of the RF chip CHIP1 and an input/output impedance of the high frequency switch RFSW and amplifier LNA so that the high frequency wireless signal can be transmitted between those elements without any loss. The matching circuit MA is provided with inductors, condensers, resistors or passive parts such as a filter.

A data signal line DS is a signal line for connecting between a data input/output circuit SIO of the processor chip CHIP2 and the high frequency modulation/demodulation circuit RF of the RF chip CHIP1. Also, a control signal line CS is a signal line for connecting the programmable input/output circuit PIO of the processor chip CHIP2 and the control circuit CON of the RF chip CHIP1. The data signal line DS is used to transmit and receive the data between the two chips, and the control signal line CS is used to be as the control line for the processor chip CHIP2 to switch the operation mode of the RF chip CHIP1. Moreover, a display control line DC is used to control the display DISP.

Also, an LNA enable terminal control line LC, an RFSW transmission/reception switching control line RC and an LNA power source line VDD1 are controlled by the RFSW/LNA control circuit LSC.

The crystal unit X2 is used for the main clock, for example, the clock of 1 MHz or more. The consumption current when the main clock is used is typically several mA. The processor chip CHIP2 stops the main clock oscillated by the crystal unit X2 at a low electric power consumption mode, proceeds to a software-standby mode and returns by using the real time clock RTC. Note that the software-standby mode is the mode that is used to reduce the electric power consumption of LSI. Concretely, in this mode, the supply of the clock is stopped, and the operations of the CPU and peripheral functions are stopped. As long as a predetermined voltage is given, the data of the register of the CPU and the built-in RAM are held. Otherwise, they are not held but removed. The release of the standby mode is carried out by an external interruption, a reset or a standby control terminal.

Figure 17:
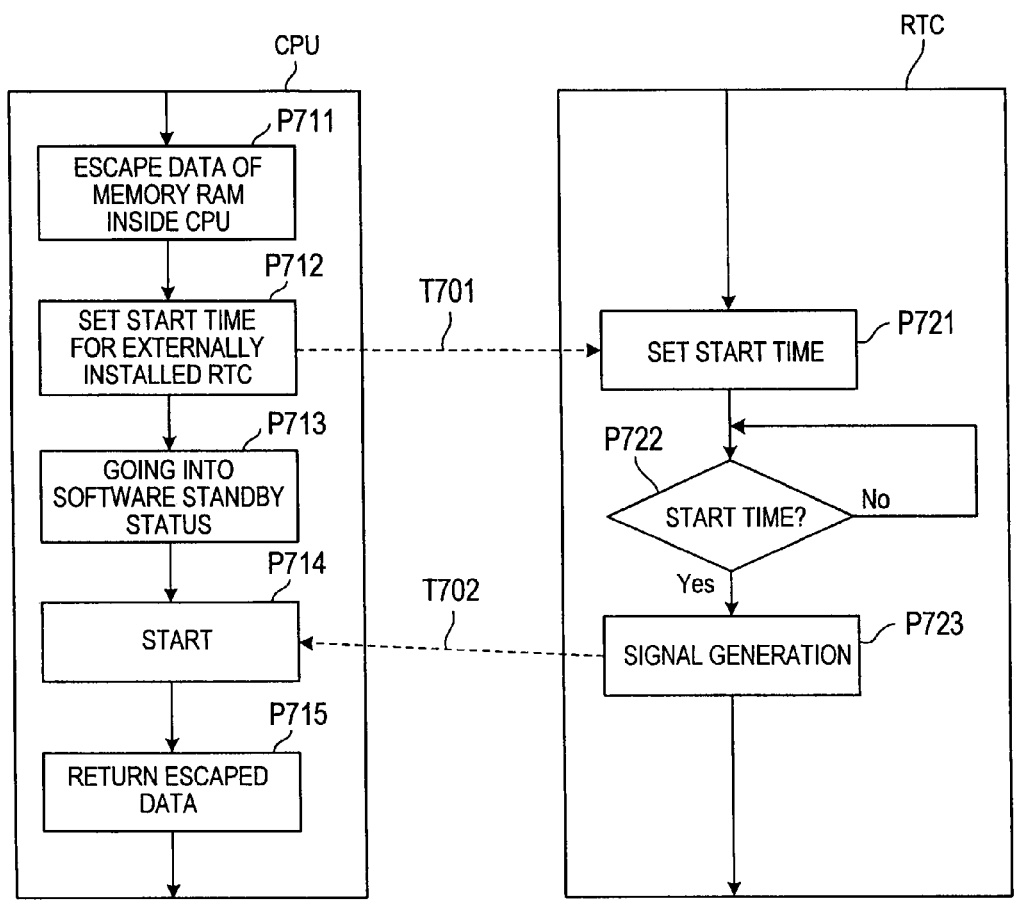
FIG. 17 is a diagram showing a flow of the externally installed real time clock (RTC) and the operations of the micro computer.

FIG. 17 shows the control method of using the real time clock RTC. At first, at P711, the data of the RAM of the CPU is escaped into the memory MEM. This is because the data is deleted at the setting of the software-standby mode. Next, at P712, the RTC sets the start time for a data T701. After that, at P713, the software-standby mode is set.

The RTC setting the start time in accordance with the data T701 at P721 checks the coming of the start time at P722. At the coming of the start time, a signal T702 is generated at P723.

The CPU is started by receiving the signal T702 at P714. After that, at P715, the data escaped at P711 is written back, and the CPU is returned to the state prior to the software-standby mode.

The start time of the CPU is determined in accordance with the time when the sensor node carries out the communication with the base station. As mentioned above, the sensing and the communication cannot be carried out in the standby state of the CPU. Thus, the CPU is designed so as to be active in the time when the communication with the base station is executed. Then, the CPU is designed such that: it becomes in the software-standby mode, in order to reduce the consumption current in the time when the communication with the base station is not executed; and it can be started when the RTC installed outside the CPU can be used to again carry out the communication.

According to the embodiments of this invention, the sensor net that has the sensor node operable at the low electric power consumption and has the high communication performance is provided at the low cost and in the short period. Consequently, the establishment of the sensor net system in the various fields becomes possible.

While the present invention has been described in detail and pictorially in the accompanying drawings, the present invention is not limited to such detail but covers various obvious modifications and equivalent arrangements, which fall within the purview of the appended claims.

What is claimed is:

1. A sensor network system, comprising:
a sensor node comprising a first sensor configured to detect at least one of data of a temperature, acceleration, and illuminance, a first CPU for receiving first data which is at least one of data of a temperature, acceleration, and illuminance detected by the first sensor, a first memory in which software executed by the CPU is installed, a first wireless communication module for transmitting the first data obtained by the first sensor, and a first interface controller; and
a base station comprising a second wireless communication module for receiving the first data transmitted from the first wireless communication module of the sensor node, a second memory for storing the data to be transmitted to the sensor node, a second CPU for controlling the data stored in the second memory to be transmitted to the sensor node, a second sensor configured to detect at least one of data of a temperature, acceleration, and illuminance, and a second interface controller, wherein
the first sensor, the first CPU, the first memory, the first wireless communication module and the first interface controller are connected through a first bus, and the second sensor, the second CPU, the second memory, the second wireless communication module and the second interface controller are connected through a second bus, wherein the base station has a third memory which is connected through an interface to the second memory and stores commands to be transmitted to the sensor node, the second memory stores a portion of the commands stored in the third memory, and when the base station receives the first data from the sensor node, if the command to be transmitted to the sensor node is stored in the second memory, the command stored in the second memory is transmitted to the sensor node.

2. The sensor network system according to claim 1, wherein the first sensor and second sensor have the same hardware configuration, the first CPU and second CPU have the same hardware configuration, the first memory and second memory have the same hardware configuration, the first wireless communication module and second wireless communication module have the same hardware configuration, and the first interface controller and second interface controller have the same hardware configuration.

3. The sensor network system according to claim 1, wherein the base station further comprises a base station controller which is connected through an interface to the first interface controller and transmits the first data received from the first interface controller through a wired communication to a server.

4. The sensor network system according to claim 1, wherein if the command to be transmitted to the sensor node is not stored in the second memory, whether or not the command is stored in the third memory is judged.

5. The sensor network system according to claim 4, wherein if the command is stored in the third memory, the command stored in the third memory is transmitted to the sensor node.

6. The sensor network system according to claim 4, wherein if the command is not stored in the third memory, an empty signal indicating that there is no command for controlling the sensor node is transmitted to the sensor node instead of the command.

7. The sensor network system according to claim 1, wherein the second memory further store a second schedule time when the second wireless communication module receives the first data corresponding to each of the commands and the third memory further store a third schedule time when the second wireless communication module receives the first data corresponding to each of the commands, and the third schedule time stored in the third memory is later than the second schedule time stored in the second memory.

8. The sensor network system according to claim 7, wherein each of the commands, which are stored in the second memory and the third memory, is stored in an order of schedule times when the first data are received by the base station, and the base station, after receiving the first data from the sensor node, rewrites an order of the commands which are stored in the second memory and the third memory.

9. The sensor network system according to claim 1, wherein the commands are not stored in the second memory, and a flag indicating whether or not the command exists in the third memory is stored in the second memory.

* * * * *